United States Patent
Gong et al.

(10) Patent No.: US 12,439,409 B2
(45) Date of Patent: Oct. 7, 2025

(54) TECHNIQUES FOR MANAGING MULTIPLE RESOURCE ELEMENT GROUPS

(71) Applicant: ZTE Corporation, Guangdong (CN)

(72) Inventors: Yuhong Gong, Guangdong (CN); Peng Hao, Guangdong (CN); Wenhao Liu, Guangdong (CN); Zhisong Zuo, Guangdong (CN); Chenchen Zhang, Guangdong (CN)

(73) Assignee: ZTE Corporation, Guangdong (CN)

( * ) Notice: Subject to any disclaimer, the term of this patent is extended or adjusted under 35 U.S.C. 154(b) by 475 days.

(21) Appl. No.: 17/663,131

(22) Filed: May 12, 2022

(65) Prior Publication Data
US 2022/0272683 A1    Aug. 25, 2022

Related U.S. Application Data

(63) Continuation of application No. 16/787,765, filed on Feb. 11, 2020, now Pat. No. 11,356,984, which is a continuation of application No. PCT/CN2017/097231, filed on Aug. 11, 2017.

(51) Int. Cl.
*H04W 72/20* (2023.01)
(52) U.S. Cl.
CPC .................. *H04W 72/20* (2023.01)
(58) Field of Classification Search
None
See application file for complete search history.

(56) References Cited

U.S. PATENT DOCUMENTS

| 11,356,984 B2* | 6/2022 | Gong .................. H04W 72/20 |
| 2014/0126513 A1 | 5/2014 | Nguyen et al. |
| 2015/0181569 A1 | 6/2015 | Kim et al. |
| 2018/0359755 A1* | 12/2018 | Sun .................. H04L 5/0053 |

FOREIGN PATENT DOCUMENTS

| CN | 104272614 | 1/2015 |
| WO | 2016/039674 A1 | 3/2016 |

OTHER PUBLICATIONS

Co-Pending European Application No. 17920856.6, Communication pursuant to Article 94(3) EPC dated Nov. 16, 2022, 5 pages.
International Search Report and Written Opinion mailed on Mar. 27, 2018 for International Application No. PCT/CN2017/097231, filed on Aug. 11, 2017 (6 pages).

(Continued)

*Primary Examiner* — Saad Khawar
(74) *Attorney, Agent, or Firm* — Perkins Coie LLP

(57) ABSTRACT

One or more devices, systems, and/or methods for utilizing a control resource set comprising a physical downlink control channel and a plurality of resource element group bundles containing different quantities of resource element groups. An example method for wireless communication comprises forming a first resource region comprising at least a first type of REG bundle and a second type of REG bundle, and performing a control channel transmission using the first resource region. The first type and the second type of REG bundles may comprise different quantities of resource element groups, and the first type and the second type of REG bundles may correspond to candidates of different aggregation levels.

20 Claims, 16 Drawing Sheets

(56) References Cited

OTHER PUBLICATIONS

Mediatek Inc., "Discussions on NR-PDCCH Structure," 3GPP TSG RAN WG1 Meeting NR AH#2, Qingdao, China, R1-1710788, 7 pages, Jun. 2017.
Huawei, et al. "Overview of PDCCH-CCE-REG mapping and REG bundling," 3GPP TSG RAN WG1, NR Ad Hoc Meeting R1 17 1001, Qingdao, China, Jun. 27-30, 2017, 7 pages.
Office Action for Korean Patent Application No. 10-2020-7007218, dated Apr. 5, 2021, 8 pages with unofficial English summary.
LG Electronics, "Discussion on NR-PDCCH structure" 3GPP TSG RAN WG1 NR Ad-hoc#2, R1-1710303, Jun. 27-30, 2017, 5 pages.
Spreadtrum Communications, "Discussion on NR-PDCCH structure," 3GPP TSG RAN WG1 Meeting #89, R1-1707791, May 15-19, 2017, 6 pages.
Office Action for Japanese Patent Application No. 2020-507546, dated May 25, 2021, 7 pages with unofficial translation.
Motorola Mobility et al: 11 On CCE and PDCCH mapping11, 3GPP Draft, Jun. 27, 2017-Jun. 30, 2017 Jun. 26, 2017.
Zte et al: 1 Search Space Design for NR-PDCCH, GPP Draft; R1-1710107 Search Space Design for NR-PDCCH, 3rd Generation Partnership Project (3GPP); Jun. 26, 2017-Jun. 30, 2017 Jun. 26, 2017.
Huawei et al: 1 PDCCH-to-CCE mapping11, 3GPP Draft; R1-1711414, 3rd Generation Partnership Project (3GPP); Jun. 27, 2017-Jun. 30, 2017 Jun. 26, 2017.
Huawei et al: 1 CCE-to-REG Mapping11, 3GPP Draft; R1-1706946, 3rd Generation Partnership Project (3GPP), Mobile Competence Centre; May 15, 2017-May 19, 2017 May 14, 2017.
EP Search Report, Application No. 17920856.6 dated Aug. 13, 2020, 10 pages.
JPO, Decision on Patent for Japanese Application No. 2020-507546, mailed on May 23, 2023, 2 pages.
Co-Pending EP Application No. 17 920 856.6, third Article 94 dated Jul. 1, 2024 5 pages.
Co-Pending Chinese Application No. 2017800938659, Notification to Complete Formalities of Registration dated Oct. 19, 2022, 4 pages with unofficial translation.
Co-Pending Chinese Application No. 2017800938659, first office action dated Apr. 25, 2022 with unofficial translation (14 pages).

* cited by examiner

FIG. 12

Inner REG bundle index (1150): 0, 2, 4, 6, 8, 10, 12, 14, 16, 18, 20, 22, 24, 26, 28, 30, 1, 3, 5, 7, 9, 11, 13, 15, 17, 19, 21, 23, 25, 27, 29, 31

CCE index for inner REG bundle (1155): 0, 1, 2, 3, 4, 5, 6, 7, 8, 9, 10, 11, 12, 13, 14, 15

FIG. 14

Inner REG bundle index: GROUP 0: 0, 3, 6, 9, 1, 4, 7, 10, 2, 5, 8, 11 | GROUP 1: 12, 15, 18, 21, 13, 16, 19, 22, 14, 17, 20, 23 | GROUP 2: 24, 27, 30, 33, 25, 28, 31, 34, 26, 29, 32, 35 | GROUP 3: 36, 39, 42, 45, 37, 40, 43, 46, 38, 41, 44, 47

CCE index: 0, 1, 2, 3, 4, 5, 6, 7, 8, 9, 10, 11, 12, 13, 14, 15

FIG. 16

Inner REG bundle index: GROUP 0: 0, 2, 4, 6, 1, 3, 5, 7 | GROUP 1: 8, 10, 12, 14, 9, 11, 13, 15 | GROUP 2: 16, 18, 20, 22, 17, 19, 21, 23 | GROUP 3: 24, 26, 28, 30, 25, 27, 29, 31

CCE index: 0, 1, 2, 3, 4, 5, 6, 7, 8, 9, 10, 11, 12, 13, 14, 15

TECHNIQUES FOR MANAGING MULTIPLE RESOURCE ELEMENT GROUPS

CROSS REFERENCE TO RELATED APPLICATIONS

This patent document is a continuation of U.S. patent application Ser. No. 16/787,765, filed Feb. 11, 2020, which is a continuation of and claims benefit of priority to International Patent Application No. PCT/CN2017/097231, filed on Aug. 11, 2017. The entire content of the before-mentioned patent application is incorporated by reference as part of the disclosure of this application.

BACKGROUND

With the development of wireless communication technology and the increasing demand for communication from users, the 5th generation mobile communication (5G) technology has become the trend of future network development in order to meet the needs of higher, faster and newer communication. The 5G communication system is considered to be implemented in a higher and wider frequency band (e.g., above 3 GHz) in order to accomplish a higher data rate. High frequency communication is characterized by increased transmission loss and penetration loss. Due to the extremely short wavelength of the high-frequency signal, a large number of antenna arrays can be used to enable beamforming technology. Beamforming technology utilizes a focused beam in an intended direction of the recipient, thereby improving the coverage of the high-frequency signal of the 5G communication system and making up for some of the signal loss resulting from the high frequency.

In the conventional communication system, the resources used for mapping the downlink control channel are distributed in the whole control resource region at a fixed resource granularity for every aggregation level. However, this traditional mechanism of resource mapping limits the channel estimation performance and transmit diversity effect of the downlink control channel.

SUMMARY

In accordance with the present disclosure, a device and/or method is/are provided for forming a control resource set that includes a physical downlink control channel, and a plurality of resource element group bundles that include different quantities of resource element groups.

As another example, a device and/or method is/are provided for receiving a control resource set that includes a physical downlink control channel, and a plurality of resource element group bundles including different quantities of resource element groups.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 12 shows an illustrative technique for defining a low aggregation level CCE index based on a logical inner REG bundle index.

FIG. 14 shows an illustrative mapping method for mapping inner REG bundle index values to CCE index values at the small aggregation level.

FIG. 16 shows an illustrative mapping method for mapping inner REG bundle index values to CCE index values at the small aggregation level.

DETAILED DESCRIPTION

Figure 1A:
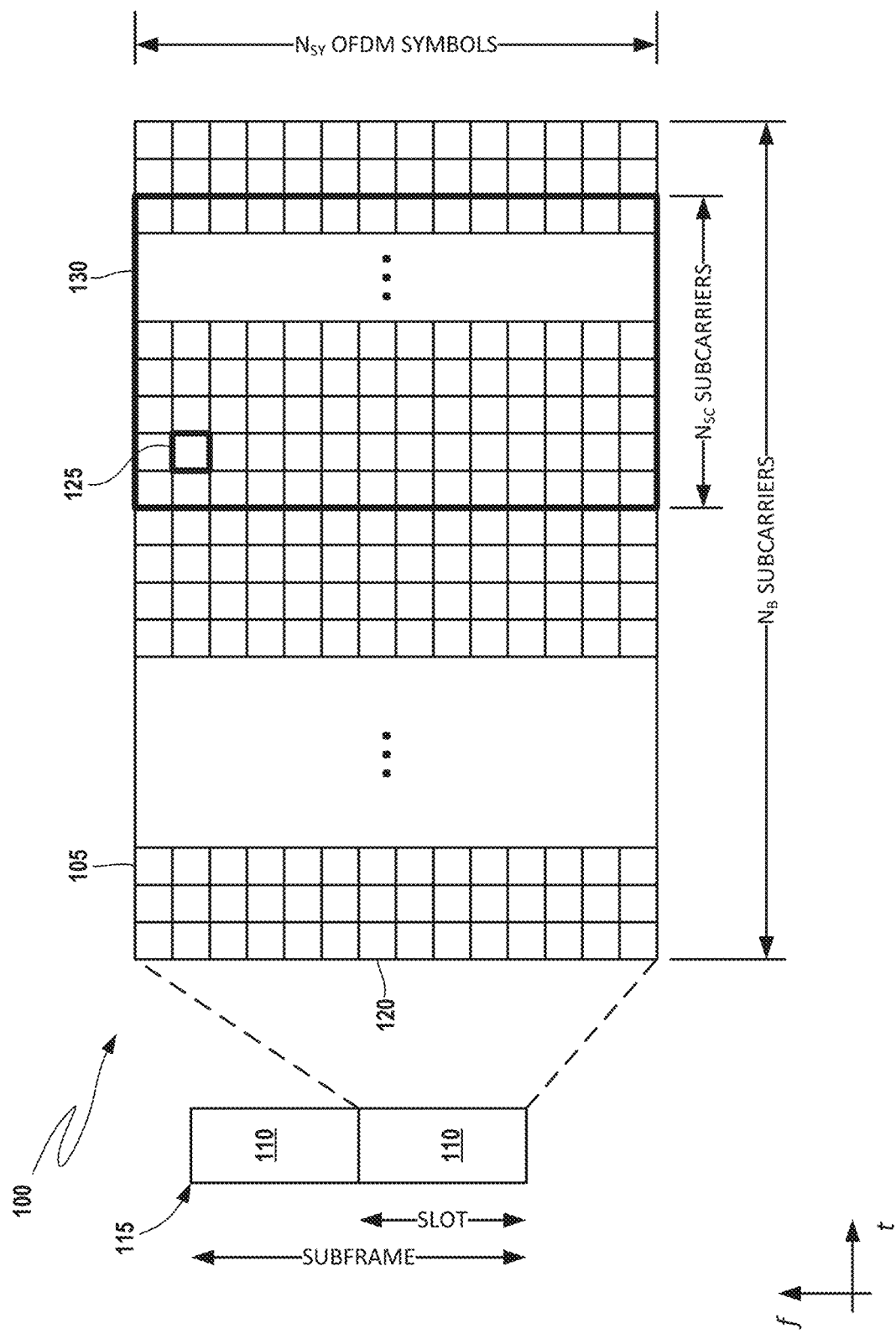
FIG. 1A is an illustrative structure of a time-frequency grid of a radio resource for transmitting data and control channels in a downlink of a wireless communication system.

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any illustrative embodiments set forth herein as examples. Rather, the embodiments are provided herein merely to be illustrative. Such embodiments may, for example, take the form of hardware, software, firmware or any combination thereof.

According to the LTE system, a Physical Downlink Control Channel ("PDCCH") is transmitted over one or more logically continuous control channel elements ("CCEs"). Different numbers of logically continuous CCEs occupied by a PDCCH transmission correspond to a different aggregation levels ("ALs"). When the CCE aggregation level is low, the PDCCH capacity is large but needs to be demodulated under favorable channel conditions. When the CCE aggregation level is high, the capacity of the PDCCH is reduced, but the PDCCH can be reliably demodulated in poor channel environments.

The PDCCH in the LTE system performs channel estimation and demodulation of the control channel based on the cell-specific reference signal (referred to as CRS) and supports only the distributed PDCCH, which maps a PDCCH to a discrete resource element group (REG). Distributed PDCCH is mainly implemented by interleaving. The interleaving is the process how to map PDCCH data flow to discrete physical resources. The interleaving used in LTE is defined based on a specified size of matrix and follows following procedure: 1) a PDCCH data flow is written in the matrix row by row; 2) perform the inter-column permutation for the matrix based on a predefined pattern, an example of such predefined pattern being defined by the expression:

$$\langle P(j) \rangle_{j \in \{0,1,\ldots,C_{subblock}^{CC}-1\}}$$

where P(j) is the original column position of the j-th permuted column and $C_{subblock}^{CC}$ is the number of columns of the matrix; 3) read out column by column from the inter-column permuted matrix. And then the interleaved PDCCH data flow is mapped to the physically continuous resources, which realize the PDCCH data flow mapping in the discrete physical resources. It should be noted that if the size of the PDCCH data flow is smaller than the size of the matrix, some dummy bits are padded in the front the PDCCH data flow to make the size of them are the same. Equivalently, the PDCCH data flow before interleaving can be understood as physical resource index and the PDCCH data flow after interleaving can understood as logical resource index, which means that physical index of the resource can be interleaved according to the above interleaving process, and the PDCCH data flow (original and not interleaved) is mapped to the logically continuous resources with logically continuous index.

In LTE, for all aggregation levels, the interleaved base units are either a REG, or a PDCCH data stream corresponding to a REG, and the interleaved resource ranges are consistent for different aggregation levels. But, in practice, this is not beneficial to the channel estimation performance and diversity gain of the downlink control channel, especially in the multi-beam scenario. Therefore, the above-mentioned defects should be avoided in the design of the 5G communication system.

According to the new Radio Access Technology ("NR") in the 5G communication system, the physical downlink control channel in the NR system (Referred to as NR-PDCCH) is based on the demodulation reference signal (DMRS) for control channel estimation and demodulation, and supports both localized and distributed transmission types. Distributed transmission is supported through interleaving. In order to reduce the blind detection complexity and terminal power consumption, one or more control resource sets ("CORESET") are configured for a user equipment ("UE") such as a mobile phone, portable computer terminal, etc. The UE only receives the downlink control channel on the configured CORESET(s). A downlink control channel is associated with only one CORESET. Multiple CORESETs can be overlapped or partially overlapped with each other. A control resource set includes multiple REGs, and a REG is defined as a PRB during a symbol as explained in detail below. Also as explained below, an NR-PDCCH includes one or more CCEs, one of which includes six REGs. Within a CCE, including one or more REG bundles, each REG bundle has a size of 2 or 3 or 6 consecutive REGs. The product of the number of REG bundles contained in a CCE and the number of REGs contained in each REG bundle is equal to 6. The REGs in a REG bundle can only use the same precoding. Different REG bundles allow the use of different precoding.

Distributed NR-PDCCH is mapped to discrete physical resources with the REG bundle (e.g., a plurality of REGs) as the base unit. The larger the size of REG bundle is, the better the channel estimation performance through the joint channel estimation can be achieved. The smaller the size of REG bundle is, the more diversity gain the PDCCH gets. Therefore, the size of the REG bundle needs to establish to balance the channel estimation performance and the diversity gain. For example, for high aggregation level control channels (e.g., aggregation levels 4, 8), which are usually used in cases where the channel environment is poor, it is advantageous to use a large (e.g., above a threshold as described below) REG bundle to improve the channel estimation performance and to compare the resources contained in the control channel of the large aggregation level. For a small aggregation-level control channel (e.g., aggregation levels 1, 2), the DMRS channel estimation performance is better in itself because of the better channel environment, so a small (e.g., below a threshold as described below) REG bundle can be used to achieve improved diversity gain. However, if the interleaving for different aggregation levels is based on the REG bundles with different sizes, candidates from different aggregation levels will overlap according to the traditional interleaving in LTE. For example, one candidate of lower AL would be partially overlapped with two candidates of higher AL. This is believed to result in more collisions between candidates at different aggregation levels, which means the PDCCH blocking probability would be raised. When the UE is blocked, such as when the resource corresponding to the candidate of the UE is occupied by or partially occupied by other users' candidates, the UE cannot be scheduled with the base station ("BS"). An example of such blocking is described below with reference to FIG. 4.

Figure 1B:
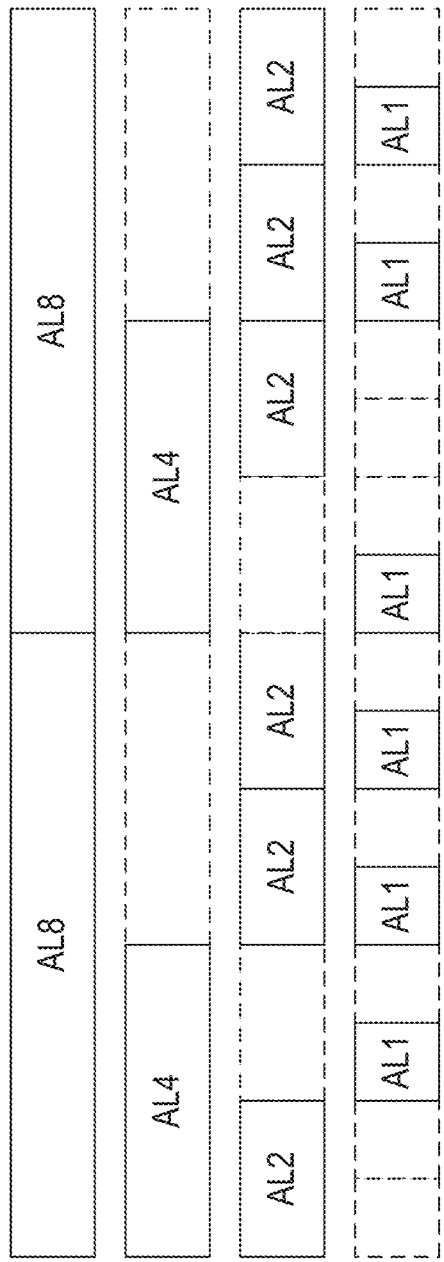
FIG. 1B shows an illustrative arrangement of overlapping candidates at different aggregation levels.

On the other hand, the UE tries to receive the downlink control channel in a given search space by blind detection. A search space includes one or more aggregation levels, each corresponding to one or more downlink control channel candidates. Each candidate includes L CCEs, where L is the aggregation level. In order to reduce the complexity of channel estimation, the NR-PDCCH should support channel estimation reuse between candidates of different aggregation levels in a search space. For example, as shown in FIG. 1B, when the low aggregation level candidates are located under the resource of the high aggregation level candidates, the channel estimation for the candidates of low aggregation level can be reused for the candidates of high aggregation level, which reduces the complexity of the channel estimation at UE, and avoid a prolonged delay that would otherwise occur due to the channel estimation.

With reference to the drawings, the communication technique utilized by the present cellular communication system can be Orthogonal Frequency Division Multiplexing (OFDM). FIG. 1A illustrates a structure of time-frequency grid 100 of radio resources for transmitting data and control channels (e.g., PDCCH) in a downlink of a wireless communication system utilizing OFDM. In FIG. 1A, the horizontal axis denotes time t, and the vertical axis denotes frequency f. An OFDM symbol, arranged in columns 105 in FIG. 1A, is the smallest transmission unit on the time axis. A slot 110 includes NSY OFDM symbols. Although N is equal to 14 according to embodiments described herein for illustration purposes, the value of N according to some embodiments can be any integer value such as 7, 14, 21, etc., depending on factors such as subcarrier spacing, for example. A subframe 115 includes two slots 110. A slot 110 is approximately 0.5 ms in duration, and a subframe is approximately 1.0 ms in duration. A subcarrier, arranged in rows 120 in FIG. 1A, is the smallest transmission unit in the frequency domain, and the entire system transmission band includes NB subcarriers.

In the time-frequency grid 100, a Resource Element ("RE") 125 is the basic unit indicated by the combination of a discrete OFDM symbol index and a discrete subcarrier index. The Resource Block ("RB") or Physical Resource Block 130 includes the 14 consecutive OFDM symbols in the time domain t in FIG. 1A and the NSC consecutive subcarriers in the frequency domain 110. For some embodiments, the value of NSC can be any integer such as 6, 12, 18, etc., but will be described herein as being equal to 12 for the sake of brevity and clarity. Accordingly, an RB 108 includes NSY×NSC Res, or 14×12 in the illustrated examples. An RB is the smallest unit that can be scheduled for transmission.

Figure 2:
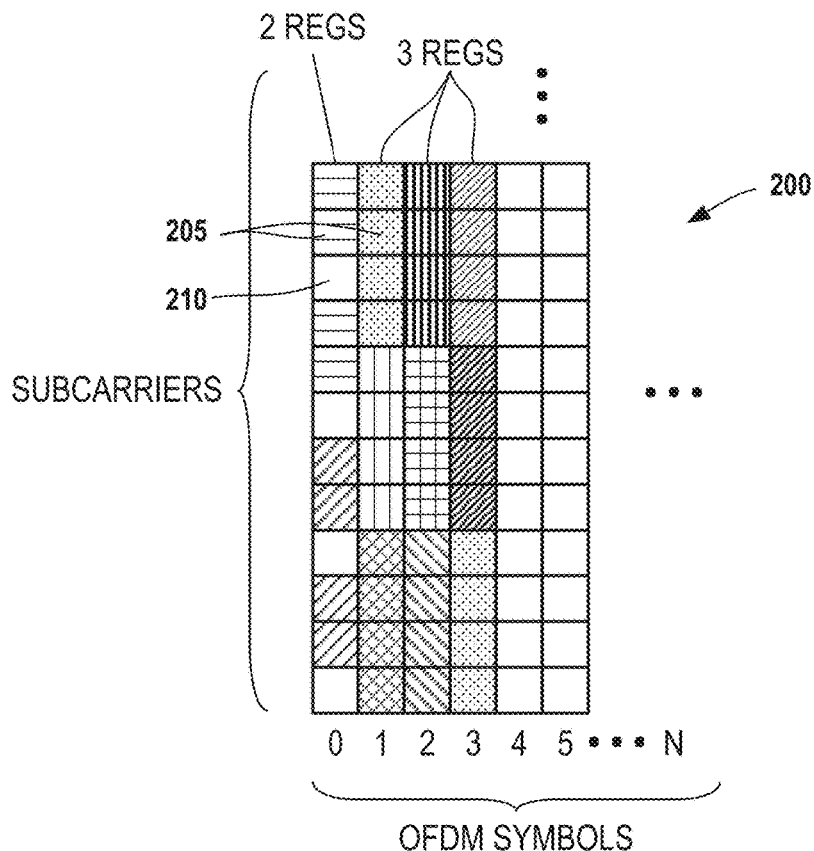
FIG. 2 schematically illustrates resource mapping of resource elements and resource element groups, which comprise four logically continuous resource elements in the first N symbols of a subframe, where N can be 1, 2, 3 or 4.

A portion of a subframe 200 is shown in FIG. 2. Each REG 205 included in the PDCCH includes 4 consecutive REs (or 4 REs separated by a cell-specific reference signal ("RS") 210) within the same OFDM symbol and the same resource block. In FIG. 2 there are two (2) REGs in the OFDM symbol 0, the first slot of the subframe 200, and there are 3 REGs in OFDM symbols 1, 2 and 3. Each CCE includes 9 REGs, which are distributed across OFDM symbols 0, 1, 2, and optionally 4, and the system bandwidth through interleaving to enable diversity and to mitigate interference.

Figure 3:
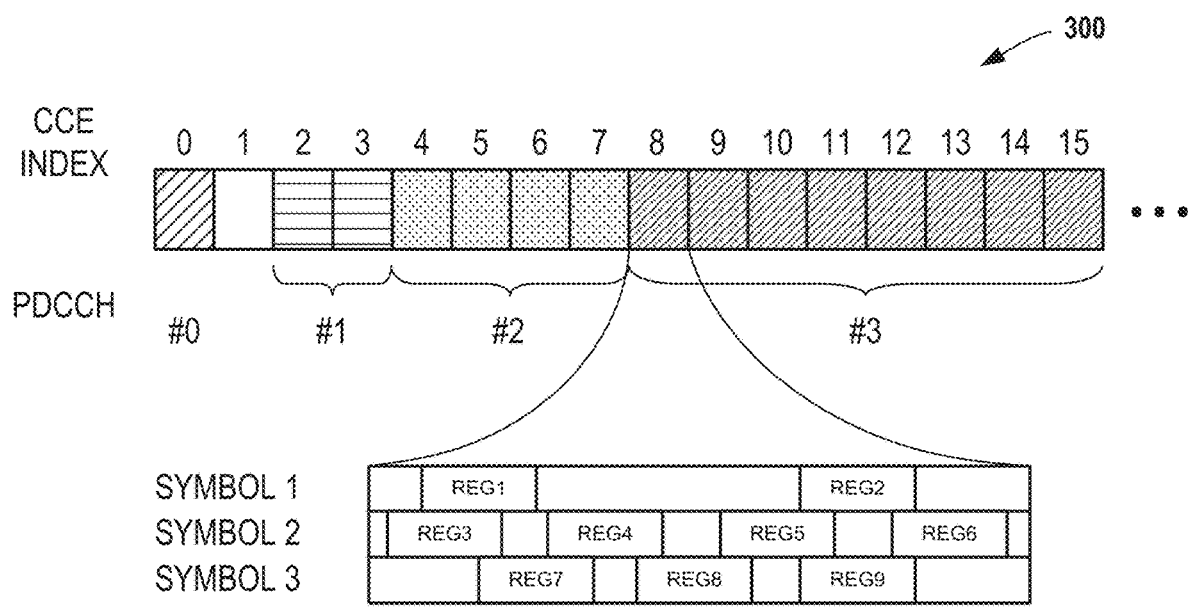
FIG. 3 schematically illustrates arrangements of control channel elements to form a PDCCH of various different aggregation levels.

FIG. 3 shows an illustrative example of a PDCCH map 300. Each PDCCH (numbered as #1, #2, #3 and #4) in the map 300 is formed from a number of CCEs, individually numbered using the CCE Index in FIG. 3. Each CCE includes nine (9) REGs, as shown in the enlarged view of CCE8. The REGs are distributed over the first three OFDM symbols in the illustrative example shown in FIG. 3, and each REG is formed from four logically continuous Res in the same symbol.

The number of CCEs in a PDCCH is called its aggregation level, and may be 1, 2, 4, or 8 consecutive CCEs (logically sequential). The total number of available CCEs is determined by the PCFICH configuration and the system bandwidth. Each PDCCH contains exactly one Downlink Control Information ("DCI"). For the illustrative example shown in FIG. 3, PDCCH #0 has an aggregation level of 1, including just CCE 0. PDCCH #1 has an aggregation level of 2, including CCE2 and CCE3. PDCCH #2 has an aggregation level of 4, including CCE4, CCE5, CCE6 and CCE7. And PDCCH #3 has an aggregation level of 8, including CCE8, CCE9, CCE10, CCE11, CCE12, CCE13, CCE14 and CCE15. A PDCCH with aggregation level n can optionally be restricted to starting only on a CCE having an index value that is a positive integer multiple of n. For example, a PDCCH with an aggregation level of 4 can only start on CCE index 0, 4, 8, 12, 16, etc.

Figure 4:
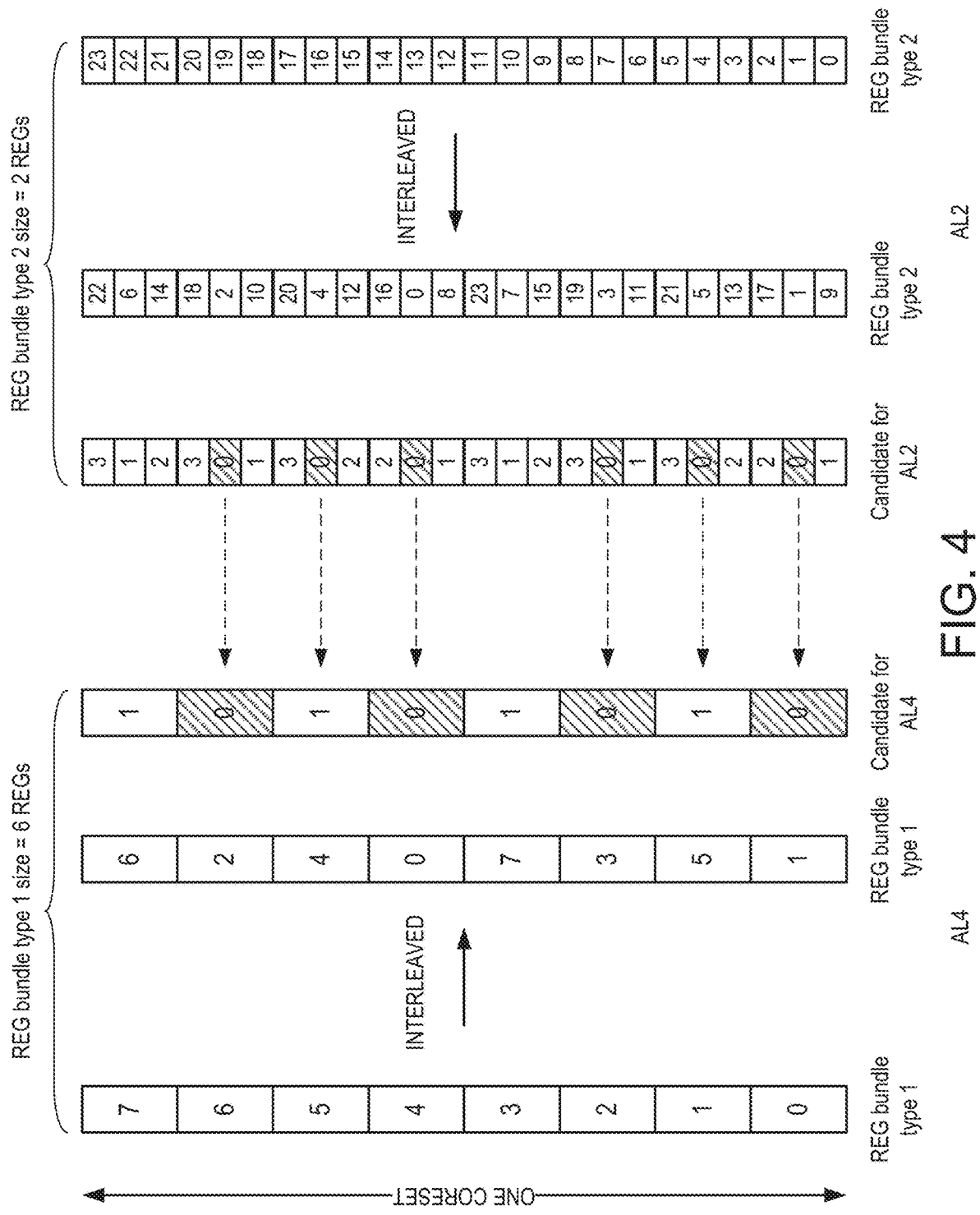
FIG. 4 shows an arrangement that is likely to result in blockage of a candidate of a physical downlink control channel as a result of interleaving control channel resources having different aggregation levels.

The historical difficulty of interleaving PDCCHs having different aggregation levels is demonstrated with reference to FIG. 4. In a CORESET for the PDCCH of aggregation level 4 ("AL4"), the REG bundle type 1 as the base resource unit for interleaving is comprised of 6 REGs, which corresponds to a CCE. For the PDCCH of aggregation level 2 ("AL2"), the REG bundle type 2 as the base resource unit for interleaving is comprised of 2 REGs, a CCE being formed by three (3) of the REG bundles of type 2. The interleaving process for the two downlink control channels is performed in FIG. 4. The interleaving technique is based on the interleaving technique of PDCCH in LTE. As can be seen from FIG. 4, after the interleaving AL2's candidate 0 is overlapped with AL4's candidate 0 and candidate 1. Therefore, when a UE's NR-PDCCH location is at candidate 0, both candidate 0 and candidate 1 of AL4 cannot be used for transmission of other NR-PDCCHs. Thus, the NR-PDCCH of AL4 is said to be blocked, or, the block ratio increased, a condition that is not favorable for channel estimation reuse. For example, if a UE's search space is comprised of candidate 0 of AL4 and candidate 0 of AL4, the channel estimation of candidate 0 of AL2 can not get only through the channel estimation reusing of the candidate 0 of AL4.

On the other hand, it is worth pointing out in FIG. 4 that if the search space of a UE is composed of AL4's candidate 0 and AL2's candidate 0, since the corresponding resources of AL2's candidate 0 does not fully encompass the entire resource range of AL4's candidate 0. In other words, AL4's candidate 0 is much "taller" than AL2's candidate 0, so AL2's candidate 0 does not fully block AL4's candidate 0.

In view of the above difficulties, the following description of how to implement the coexistence of REG bundles of different sizes in the same resource area (CORESET) is provided with reference to various embodiments, and can support DMRS reuse between candidates of different aggregation levels, resulting in a decrease in the blocking probability of the NR-PDCCH.

It is to be noted that the REG bundle index in the examples that follow can also be understood as an NR-PDCCH symbol stream (or NR-PDCCH data flow) index, and the order of the logical REG bundle index is the mapping order of the NR-PDCCH symbol stream. Further, the number of modulation symbols included in the NR-PDCCH symbol stream corresponding to one symbol stream index can be equal to the number of REs that can be used to transmit the NR-PDCCH symbol stream contained in a REG bundle.

The embodiments of the present disclosure may be arbitrarily combined. For example, when the ratio of the REG bundle size of the relatively large aggregation level and the REG bundle size of the relatively small aggregation level is 2, using the method described in the following Example 1, when the large aggregation level REG bundle and the small aggregation level REG bundle is 3, the method described in the following Example 2 can used, and so on.

The use of "relatively large" or "large" herein is to be understood relative to the corresponding "relatively small" or "small" value used in the same example. For instance, a "relatively high aggregation level" must be greater than a certain threshold, such as the "relatively low aggregation level" used in the same example. Likewise, a "high aggregation level" is simply required to be greater than the "low aggregation level" described in the same example.

The "REGs have the same precoder" as described in the examples of the present disclosure means that the channels for these REGs are continuous or the UE can perform joint channel estimation on these REGs.

Example 1

For the present example, a REG bundle with bundle size of 6 (one REG bundle including 6 REGs) coexists with a REG bundle with bundle sizes of 3 (one REG bundle including 3 REGs) and 2 (one REG bundle including 2 REGs). The present example will be described with reference to FIGS. 5 and 6.

Different resource ranges are for different REG bundle sizes for interleaving, different REG bundle sizes correspond to different aggregation levels. The larger REG bundle 500 has a resource range of the entire CORESET for interleaving. The smaller REG bundle 505 has a resource range of the resource corresponding to the candidates of the UE in the larger REG bundle (row referred to at 500). In this way, it is possible to ensure that the low aggregation level candidates (cross-hatched members of row 510) of the UE are within the resource range of the high aggregation level candidates (cross-hatched members of row 515). As a result, the low aggregation level candidates 510 can reuse the channel estimation result of the high aggregation level candidates 515 and effectively avoid that more than one candidates of high AL 515 being blocked by one candidate of low aggregation level.

Figure 5:
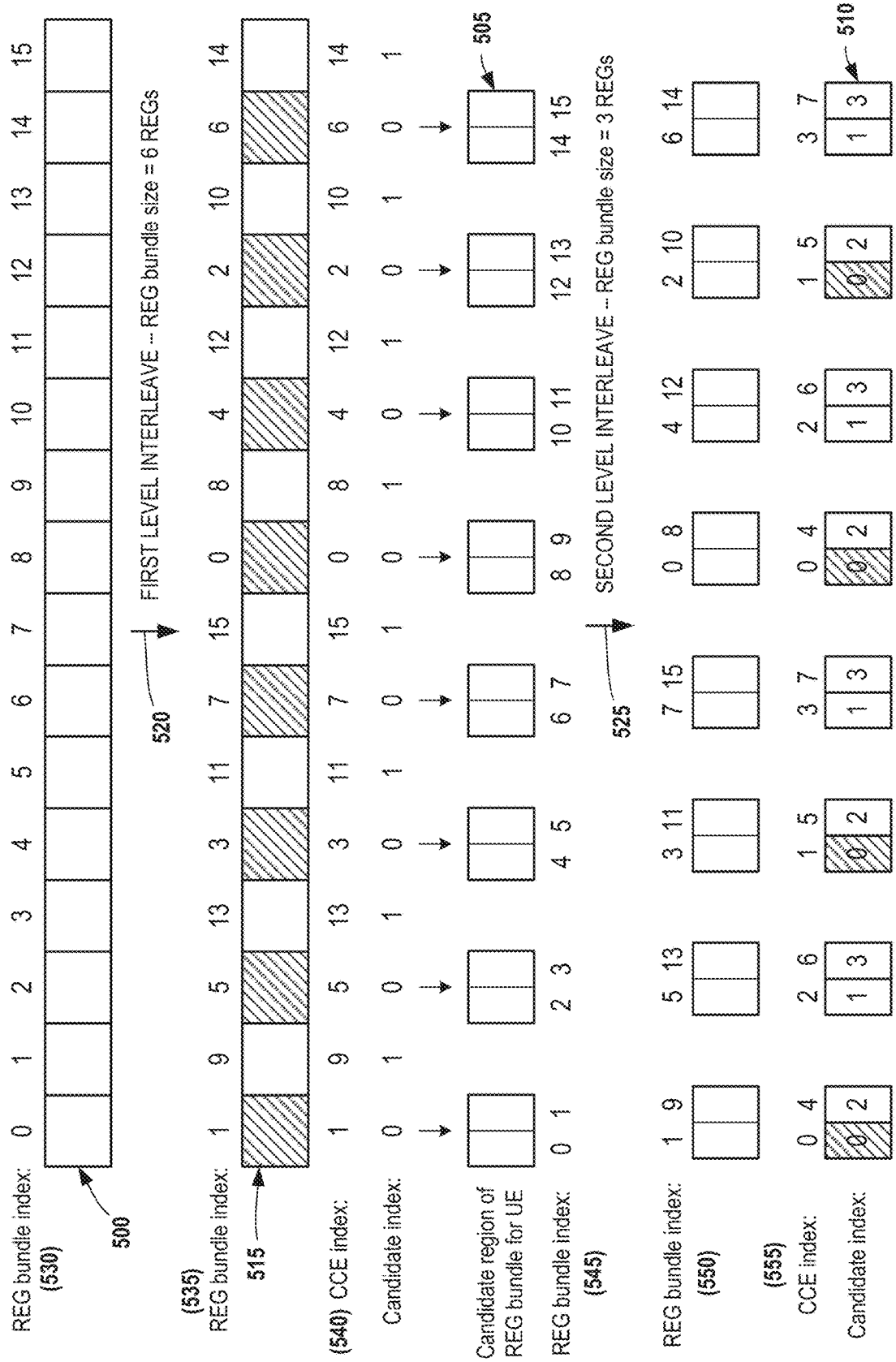
FIG. 5 shows an illustrative embodiment of resources having different aggregation levels undergoing interleaving, wherein resource element group (REG) bundles subjected to second level interleaving include 3 REGs.

As shown in FIG. 5, the interleaving of the NR-PDCCH can optionally be achieved by two levels of interleaving: (i) the first level of interleaving 520 being based on the first level of REG bundle (larger REG bundle 500) within the first resource range, and (ii) the second level of interleaving 525 within the second resource range based on the second level of REG bundle (smaller REG bundle 505). Wherein the first resource range for the larger REG bundle 500 can optionally be the entire CORESET and the second resource range for the smaller REG bundle 505 can be the resource of one or more of the candidates 510 of the UE corresponding to the first level of REG bundle.

In FIG. 5, assume a CORESET with a total of 16 CCE, and two types of REG bundles, respectively: the first level (larger) REG bundle 500 and the second level (smaller) REG bundle 505, where the first level REG bundle size is 6 REGs, and the second level REG bundle size is 3 REGs. The first level REG bundle 500 can be used for interleaving for NR-PDCCH of high aggregation level. The second level REG bundle 505 can be used for interleaving for NR-PDCCH of low aggregation level.

The process depicted in FIG. 5 involves a first level of interleaving 520. The larger REG bundle 500 in the order (such as CORESET frequency domain from low to high order) indicated by the first level REG bundle physical index 530. An example of the interleaving can involve a subblock interleaving. The result of the first level of interleaving is the reorganized resources of the larger REG bundle 500 into the order indicated by a first level REG bundle logical index 535. A first level CCE index 540 reflects the first level REG bundle logical index 535 here because a larger REG bundle 500 and the CCE are of the same size. Accordingly, a REG bundle is a CCE, so the CCE index 540 and the REG bundle index 535 are the same.

After the first level interleaving 520, the UE determines the resource range of candidates of high aggregation level for it. For example, the resource range of candidates of the high aggregation level determined in FIG. 5 is eight first-level CCEs with the first level CCE0 as the starting position of the high aggregation level, which corresponds to candidate 0 of high AL (AL8).

Within the resource range of high aggregation level determined above, the smaller REG bundle 505 is numbered in a defined order (for example, in the order of the frequency domain in the resource range of the high aggregation level determined above, from low to high). This ordering is referred to as the second-level REG bundle physical index 545. The second-level REG bundle 505 is then subjected to interleaving, resulting in the interleaved order corresponding to the second level REG bundle logical index 550. The formation of the second level CCE index 555 based on the second REG bundle having a size of three REGs, so every two consecutive logical second level REG bundles form a CCE. However, some embodiments can utilize a second REG bundle size that results in a CCE formed from more than two consecutive logical second level REG bundles.

Figure 6:
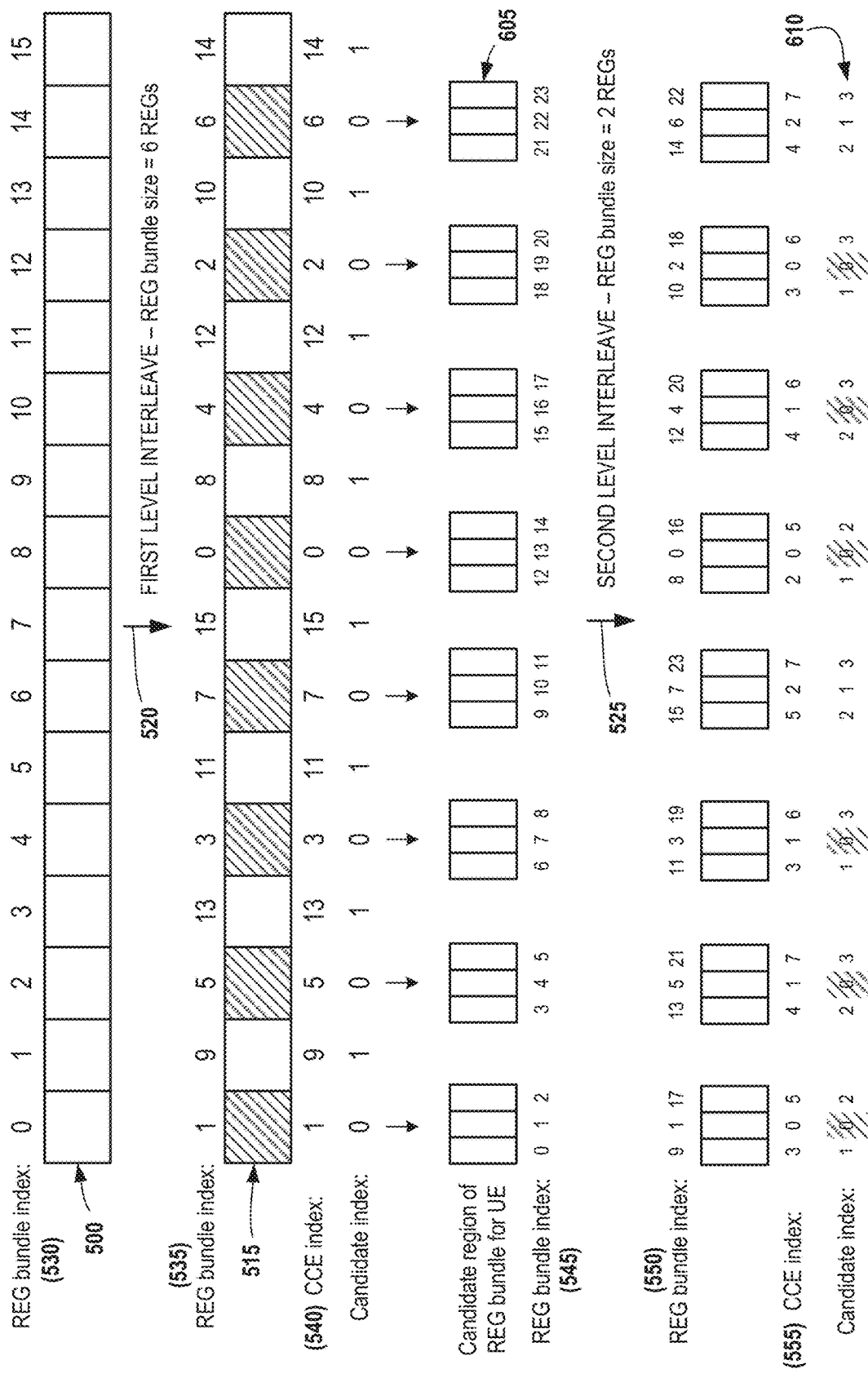
FIG. 6 shows an illustrative embodiment of resources having different aggregation levels undergoing interleaving, wherein REG bundles subjected to second level interleaving include 2 REGs.

For example, in FIG. 6, the first level of interleaving 520 is performed as described above with reference to FIG. 5. But, in FIG. 6, formation of the second level CCE index is based on a second REG bundle 605 having a size of two REGs, instead of three REGs as shown in FIG. 5. Thus, every three consecutive logical second level REG bundles forms a CCE in FIG. 6.

It can be seen from FIGS. 5 and 6 that all the candidates (cross hatched members of the row 510, 610) of the low aggregation level obtained by the above-mentioned method are located within the range of candidates 515 of the high aggregation level. Further, any one of the candidates 610 of low aggregation level can be located under the resource of a maximum of (e.g., centrally aligned with) one of the candidates 515 of high aggregation level. The low level aggregation level candidates 510, 610 can support a smaller-sized REG bundle than the high aggregation level candidates, which improves flexibility of the resource granularity of a precoder used for directional beamforming.

For all or at least some of the embodiments discussed herein, it is to be noted that the interleaving techniques in the embodiments of the present disclosure may be any existing or developing interleaving techniques. The interleaving techniques may be the same, or different from those used by LTE system, and the size of the column permuting pattern can optionally utilize a value of permuting addresses other than 32.

Further, prior to the first level of interleaving 520 or the second level of interleaving 525 in embodiments of the present disclosure, the REG bundles to be interleaved can be divided into N groups (N is an integer greater than 1), and then interleaving the groups. If i is an integer greater than or equal to 1, but less than N, the divided REG bundle i would contain the REG bundles whose index modulo to N is equal to i−1. The REG bundles within the group can optionally not be interleaved.

Example 2

For Example 2, REG bundle with bundle size of 6 coexists with REG bundle with bundle sizes of 3 and 2. The present example will be described with reference to FIGS. 7 and 8.

Different resource ranges are for different REG bundle sizes for interleaving, different REG bundle sizes correspond to different aggregation levels. The larger REG bundle 700 has are source range of the entire CORESET for interleaving. The smaller REG bundle 705 has a resource rage of the resource corresponding to the candidates of the UE in the larger REG bundle 700. In this way, it is possible to ensure that all, or at least one or a plurality of the small aggregation level candidates (cross hatched members of row 710) of the UE is/are within the resource range of the large aggregation level candidates (cross hatched members of row 715). Thus, the small aggregation level candidates 710 can reuse the channel estimation result of the large aggregation level candidates 715, and effectively avoid that more than one candidates of high AL 715 being blocked by one candidate of low aggregation level.

Figure 7:
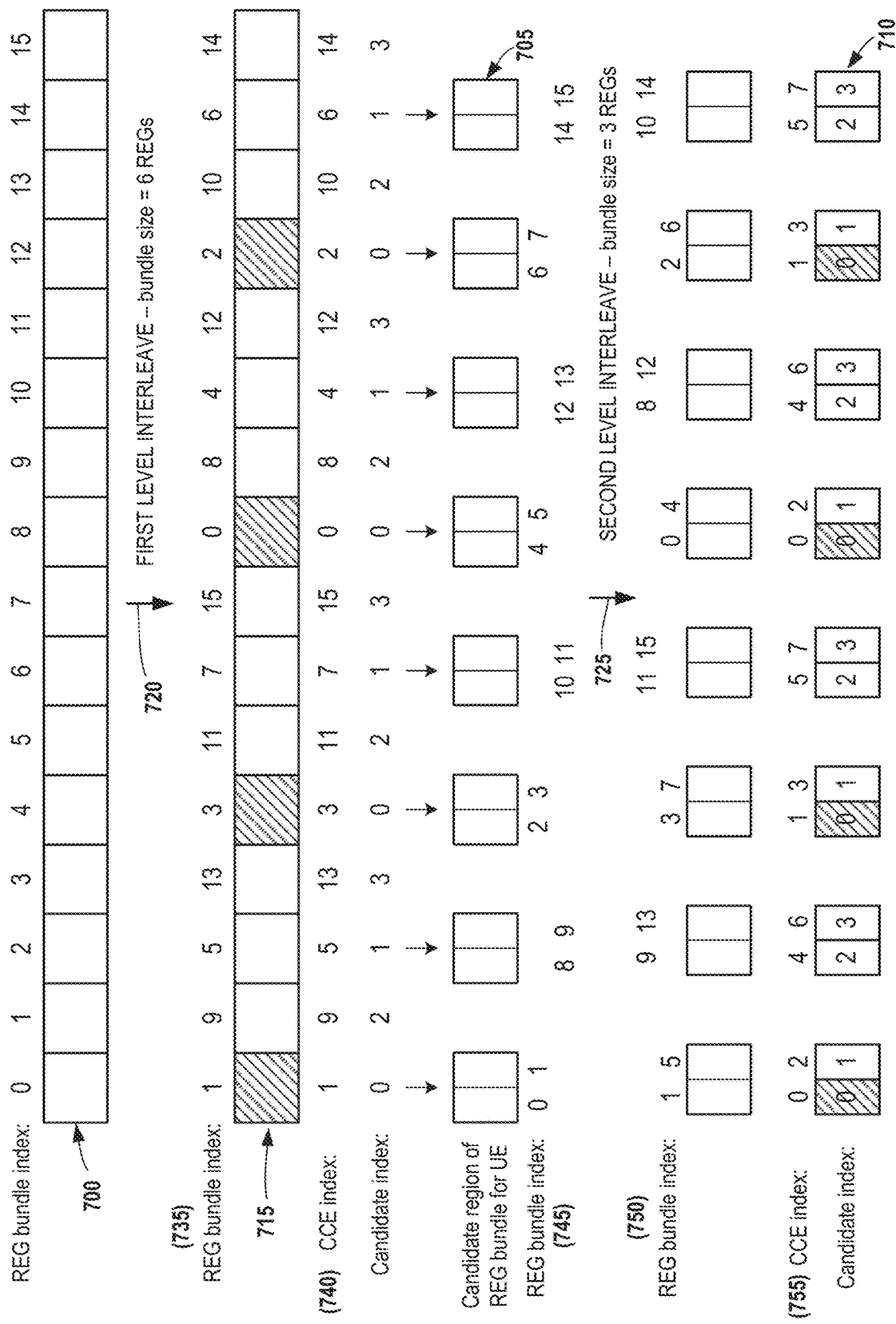
FIG. 7 shows another illustrative embodiment of resources having different aggregation levels undergoing interleaving, wherein REG bundles subjected to second level interleaving include 3 REGs.

As shown in FIG. 7, the interleaving of the NR-PDCCH may be achieved by two-level interleaving: (i) the first level interleaving 720 being based on the first level (larger) REG bundle 700 within the first resource range, and (ii) the second level interleaving 725 within the second resource range based on the second level (smaller) REG bundle 705. Optionally, the first level resource range can be the entire CORESET, and the second level resource range can be the resource range from which one or more of the candidates 710 of the UE corresponding to the first level of REG bundle are derived. Optionally, there are a plurality of second level resource ranges, where each of the second level resource ranges corresponds to the resource of one of the candidates of first level REG bundles.

In FIG. 7, it is assumed that the CORESET includes a total of 16 CCE, and there are two REG bundles, respectively: (i) the first level (larger) REG bundle 700 and the second level (smaller) REG bundle 705. The first level REG bundle size is 6 REGs, and the second level REG bundle size is 3 REGs. The first level REG bundle 700 can be used for interleaving for NR-PDCCH of high aggregation level. The second level REG bundle 705 can be used for interleaving for NR-PDCCH of low aggregation level.

As depicted in FIG. 7, the first level of interleaving 720 interleaves the first REG bundle 700 in an order (such as CORESET frequency domain from low to high order) indicated by the first level REG bundle physical index 730 to obtain the first level REG bundle logical index 735. A first level CCE index 740 reflects the first level REG bundle logical index 735 here because the larger REG bundle 700 and a CCE are the same size, so the REG bundle 700 is a CCE and, accordingly, the CCE index 740 and REG bundle index 735 are the same.

After the first level interleaving 720, the UE determines the resource range of candidates 715 of high aggregation level. For example, the resource range of candidates 715 of high aggregation level determined in FIG. 7 that there are eight first-level CCEs with the first level CCE0 as the starting position of the high aggregation level (corresponding to candidate 0 and candidate 1 of high AL i.e. AL4).

Within the resource range of the high aggregation level determined, the smaller REG bundle 705 will be ordered (for example, in the order of the frequency domain in the resource range of the high aggregation level determined above, from low to high) to form a second-level REG bundle physical index 745. The second-level REG bundles with the second-level REG bundle physical index 745 corresponding to each of the identified candidates 715 of high AL are interleaved in the resource of corresponding candidate. As shown in FIG. 7, the second level REG bundle physical index 745 values between 0 and 7, inclusive, are interleaved and the second level REGs with physical index values of 8 to 15, inclusive, are also interleaved, optionally separate from the second level REGs with REG bundle physical index 745 values between 0 and 7. The logical index 750 of the second-level REG bundle is obtained, and the second-level CCE index 755 is formed in the order of the logical index 750 of the second-level REG bundle. The pattern in FIG. 7, is that the even-valued REG bundle index values 750 are halved to define the second level CCE index values. The odd-valued REG bundle index values 750 are also halved and rounded down to the nearest integer to define the second level CCE index values. Since the size of a second REG bundle 705 is three REGs, each two logically continuous second level REG bundles forms a CCE.

Figure 8:
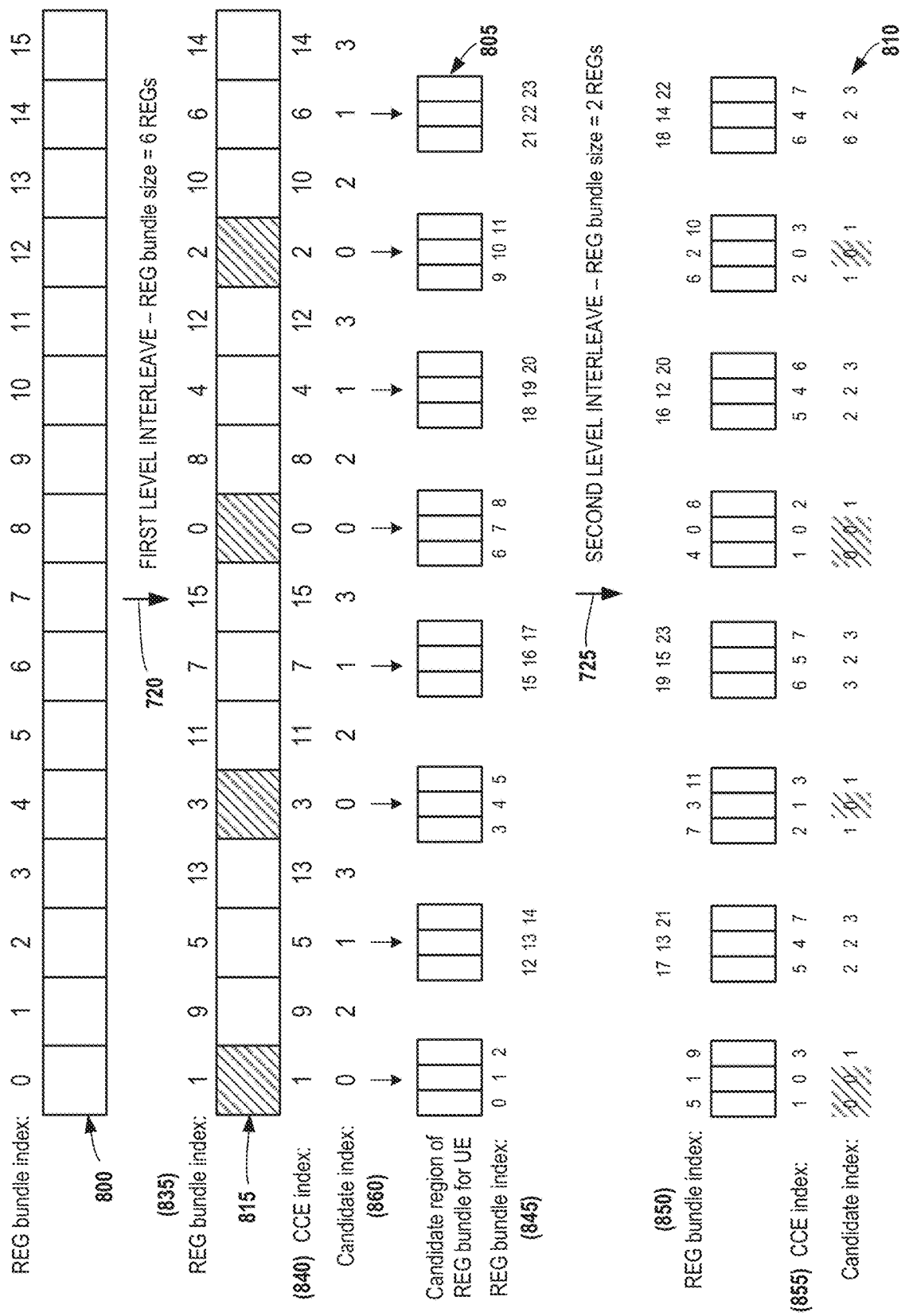
FIG. 8 shows another illustrative embodiment of resources having different aggregation levels undergoing interleaving, wherein REG bundles subjected to second level interleaving include 2 REGs.

For embodiments such as those shown in FIG. 8, it is assumed that there is CORESET with a total of 16 CCE, and two REG bundles, respectively: (i) the first level (larger) REG bundle 800, and (ii) the second level (smaller) REG bundle 805. The first level REG bundle 800 size is 6 REGs, and the second level REG bundle 805 size is 2 REGs. The first level REG bundle 800 can be used for interleaving for NR-PDCCH of high aggregation level. The second level REG bundle 805 is used for interleaving for NR-PDCCH of low aggregation level.

For such embodiments, the first level of interleaving 720 is performed as described above with reference to FIG. 5, to obtain the larger REG bundle logical index 835. In accordance with the order of the larger REG bundle logical index 835, the order of the first level CCE index 840 is generated to match the order of the larger REG bundle logical index 835 because a first level REG bundle and a CCE are of the same size. Thus, a REG bundle amounts to a CCE in the present example.

After the first level interleaving 720, the UE determines the resource range of candidates 815 of high aggregation level. For example, the resource range of candidates 515 for the high aggregation level determined in FIG. 5 was eight first-level CCEs, with the first level CCE0 as the starting position of high aggregation level candidates 515 corresponding to candidate 0 of ALB. But in FIG. 8, there are eight first-level CCEs with the first level CCE0 as the starting position of the high aggregation level candidates 815 corresponding to candidate 0 and candidate 1 of AL4.

Within the resource range of the high aggregation level determined above, the smaller REG bundle 805 is arranged in a defined order (for example, within the frequency domain of the high aggregation level, from the low to high) to form a second-level REG bundle physical index 845. According to the second-level REG bundle physical index 845, index values 0-11, inclusive, correspond to the high aggregation level candidates 815 with index value 860 "0", as identified above. According to the second-level REG bundle physical index 845, index values 12-23, inclusive, correspond to the high aggregation level candidates 815 with and index value 860 of "1", as identified above. The second-level REG bundle 805 is subjected to the second level of interleaving 725 to obtain the logical index values 850 for the smaller REG bundle 805. Formation of the second level CCE index 855 is based on the smaller REG bundle 805 having a size of two REGs, so every three logically consecutive second-level REG bundles form a CCE in FIG. 8.

It can be seen from FIGS. 7 and 8 that all the candidates 710, 810 of low aggregation level obtained by the above procedure are located within the range of the candidates 715, 815 of the high aggregation level. Further, any one of the candidates 710, 810 of low aggregation levels are located at a maximum of (e.g., approximately centrally aligned with) one candidate 715, 815 in the resources of the high aggregation level. The low level aggregation level candidates 710, 810 can support a smaller-sized REG bundle than the high aggregation level candidates 715, 815, which improves the resource granularity of a precoder used for directional beamforming.

Example 3

For Example 3, REG bundle with bundle size 6 coexists with REG bundle with bundle sizes 3 and 2. The present example will be described with reference to FIGS. 9 and 10.

Different REG bundle sizes are for different aggregation levels, and in different resource range for interleaving optionally. A larger REG bundle 900 can have are source range of the entire CORESET for interleaving, and a small REG bundle 905 can have a resource range which includes the resources of one or more of the candidates of the UE corresponding to the larger REG bundle 900. In this way, it is possible to ensure that the small aggregation level candidates (cross-hatched members of row 910) of the UE are within the resource range of the large aggregation level candidates (cross-hatched members of row 915). As a result, the small aggregation level candidates 910 can reuse the channel estimation result of the large aggregation level candidates 915 and effectively avoid that more than one high AL candidates corresponding to large REG bundle size being blocked by only one low AL candidate corresponding to small REG bundle size.

Figure 9:
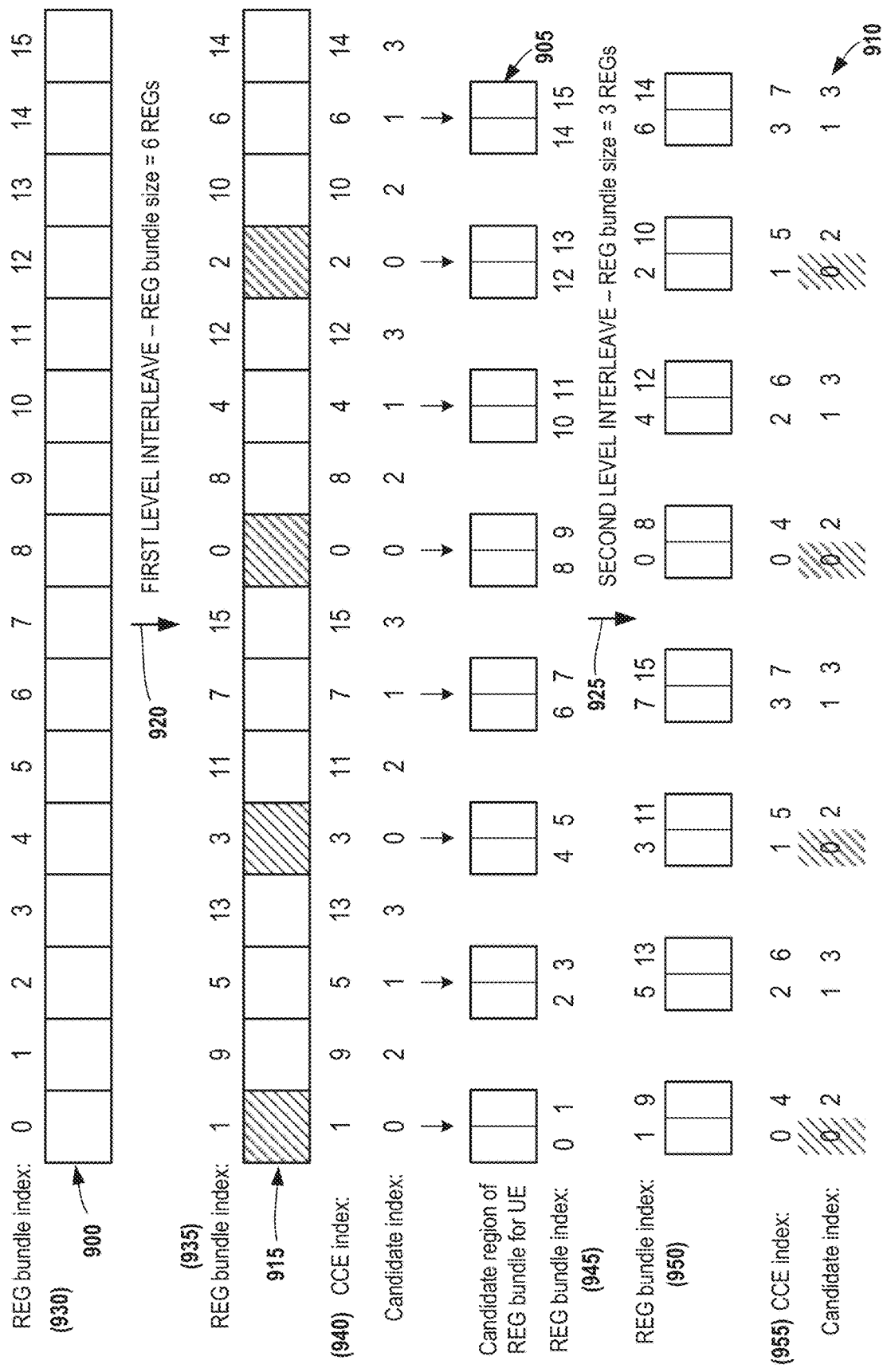
FIG. 9 shows another illustrative embodiment of resources having different aggregation levels undergoing interleaving, wherein REG bundles subjected to second level interleaving include 2 REGs.

As shown in FIG. 9, the distributed NR-PDCCH may be achieved by two-level interleaving: (i) the first level interleaving 920 being based on the first level REG bundle (larger REG bundle 900) within the first resource range, and (ii) the second level interleaving 925 within the second resource range based on the second level REG bundle (smaller REG bundle 905). Wherein the larger REG bundle 900 can optionally be the entire CORESET and the smaller REG bundle 905 can be the resource range from which one or more of the high AL candidates 910 of the UE corresponding to larger REG bundle are derived. Optionally, for second level interleaving, different interleaving schemes are used depending on different ratio of the first level REG bundle size and the second level REG bundle size. And further optionally, the different interleaving scheme means any one or more steps included in the process of the sub-block interleaving used in LTE, such as different column-permuted pattern (also called interleaving pattern) are used.

In FIG. 9, assume a CORESET with a total of 16 CCE, and two REG bundles, respectively: the first level (larger) REG bundle 900 and the second level (smaller) REG bundle 905. The first level REG bundle size is 6 REGs, and the second level REG bundle size is 3 REGs. The first level REG bundle 900 can be used for interleaving of NR-PDCCH with a high aggregation level. The second level REG bundle 905 can be used for interleaving of NR-PDCCH with a low aggregation level.

The process depicted in FIG. 9 involves a first level of interleaving 920, where the larger REG bundle 900 in the order (such as CORESET frequency domain from low to high order) indicated by the first level REG bundle physical index 930, for example. An example of the interleaving can involve sub-block interleaving based on a defined interleaving matrix. The result of the first level of interleaving is the reorganized resources of the larger REG bundle 900 into the order indicated by a first level REG bundle logical index 935. A first level CCE index 940 reflects the first level REG bundle logical index 935 here because the larger REG bundle 900 and the CCE are of the same size. Accordingly, a REG bundle is a CCE, so the CCE index 940 and the REG bundle index 935 are the same.

After the first level interleaving 920, the UE determines the range of candidates (cross hatched members of the row 915) for the high aggregation level. For example, the range of candidates for the high aggregation level determined in FIG. 5 is eight first-level CCEs with the first level CCE0 as the starting position of the high aggregation level corresponding to candidate 0 of ALB. But in FIG. 9, there are also eight first-level CCEs with the first level CCE0 as the starting position of the high aggregation level candidates 915 but corresponding candidate 0 and candidate 1 of AL4.

Within the resource range of the high aggregation level determined above, the smaller REG bundle 905 is numbered in a defined order (for example, in the order of the frequency domain in the resource range of the high aggregation level determined above, from low to high). This ordering is referred to as the second-level REG bundle physical index 945. The second-level REG bundle physical index 945 is then subjected to the second level interleaving 925, resulting in the interleaved order corresponding to the second level REG bundle logical index 950. The formation of the second level CCE index 955 is based on the second REG bundle 905 having a size of three REGs, so every two logically consecutive second level REG bundles (which means two second level REG bundles with continuous second level REG bundle logical index) collectively form a CCE. However, some embodiments can utilize a second REG bundle size that results in a CCE formed from more than two logically consecutive second level REG bundles.

Figure 10:
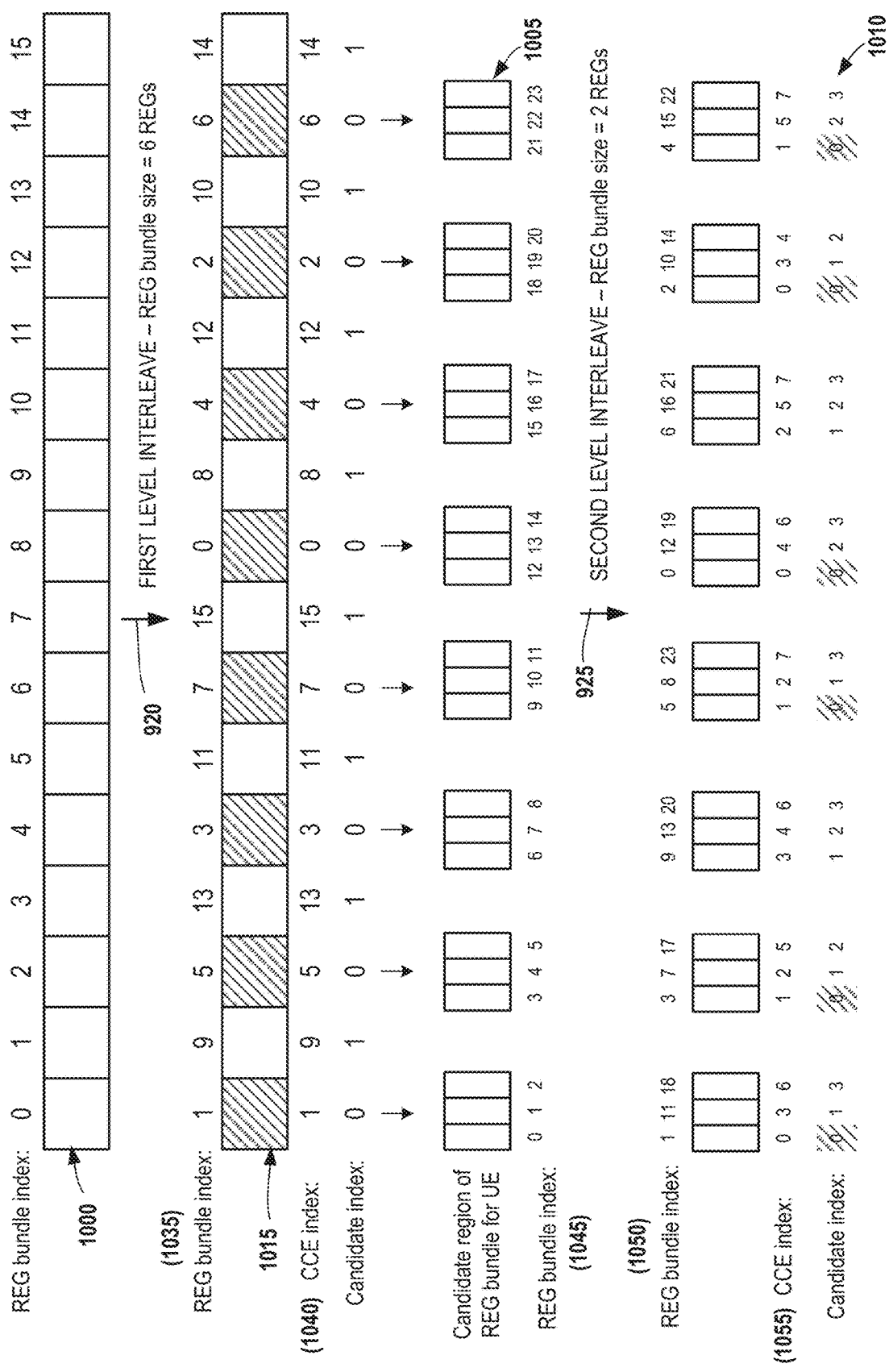
FIG. 10 shows another illustrative embodiment of resources having different aggregation levels undergoing interleaving, wherein REG bundles subjected to second level interleaving include 2 REGs.

For example, in FIG. 10, it is assumed that there is CORESET with a total of 16 CCE, and two REG bundles, respectively: (i) the first level (larger) REG bundle 1000, and (ii) the second level (smaller) REG bundle 1005. The first level REG bundle 1000 size is 6 REGs, and the second level REG bundle size is 2 REGs. The first level REG bundle 1000 can be used for interleaving of NR-PDCCH with high aggregation level. The second level REG bundle 1005 can be used for interleaving of NR-PDCCH with low aggregation level.

For such embodiments, the first level of interleaving 920 is performed as described above with reference to FIG. 9, to obtain the larger REG bundle logical index 1035. In accordance with the order of the larger REG bundle logical index 1035, the order of the first level CCE index 1040 is generated to match the order of the larger REG bundle logical index 1035 because a first level REG bundle and a CCE are of the same size. Thus, a REG bundle amounts to a CCE in the present example.

After the first level interleaving 920, the UE determines the resource range of candidates 1015 of high aggregation level. For example, the resource range of high AL candidates 515 determined in FIG. 5 was eight first-level CCEs, with the first level CCE0 as the starting position of high aggregation level candidates 515 corresponding to candidate 0 of AL 8. Likewise, in FIG. 10, there are also eight first-level CCEs with the first level CCE0 as the starting position of the high aggregation level candidates 1015 corresponding to candidate 0 of AL8.

Within the resource range of the high aggregation level determined above, the smaller REG bundle 1005 is arranged in a defined order (for example, within the frequency domain of the high aggregation level, from the low to high) to form a second-level REG bundle physical index 1045. The second-level REG bundle 1005 is subjected to a second level interleave 1025 that uses a different interleaving scheme than that used for the first level interleave 920. For example, the second level interleaving 1025 can utilize a column-permuted pattern (also called interleaving pattern) such <1, 11, 17, 13, 13, 20, 5, 8, 23, 0, 12, 19, 6, 16, 21, 2, 10, 14, 4, 15, 22> which is different with the column-permuted pattern used for the first level interleaving, resulting in a logical index 1050 of the second-level REG bundle. The second-level CCE index 1055 is formed according to the logical index 1050 of the second-level REG bundle. Since the size of a second REG bundle is 2 REGs, every three logically consecutive second-level REG bundles form a CCE.

It can be seen from FIGS. 9 and 10 that all the candidates (cross hatched members of the row 910, 1010) of the low aggregation level corresponding to larger REG bundle obtained by the above-mentioned method are located within the range of candidates 915, 1015 of the high aggregation level corresponding to small REG bundle. Further, any one of the candidates 910, 1010 of the low aggregation level corresponding to small REG bundle can be located at a maximum of (e.g., substantially centrally aligned with) one of the candidates 915, 1015 of the high aggregation level corresponding to larger REG bundle. The low level aggregation level candidates 910, 1010 can support a smaller-sized REG bundle than the high aggregation level candidates, which improves the resource granularity of a precoder used for directional beamforming.

Example 4

For Example 4, the REG bundle with bundle size 6 coexists with the REG with bundle size 2. The present example will be described with reference to FIGS. 11 and 12.

Different REG bundle to CCE mappings (REG bundle to CCE mapping also called CCE indexing) are defined for different REG bundle sizes, and the different REG bundle sizes correspond to different aggregation levels, such as large REG bundle sizes corresponding to high aggregation levels, and small REG bundle sizes corresponding to a low aggregation level. In the present example, a CCE indexing establishes a mapping (or mapping pattern) between the REG bundle logical index and the CCE index. For small REG bundle, the CCE mapping results that all the small REG bundles within any one of the low AL candidates corresponding to small REG bundle is located in the same one high AL candidate corresponding to large REG bundle.

Figure 11:
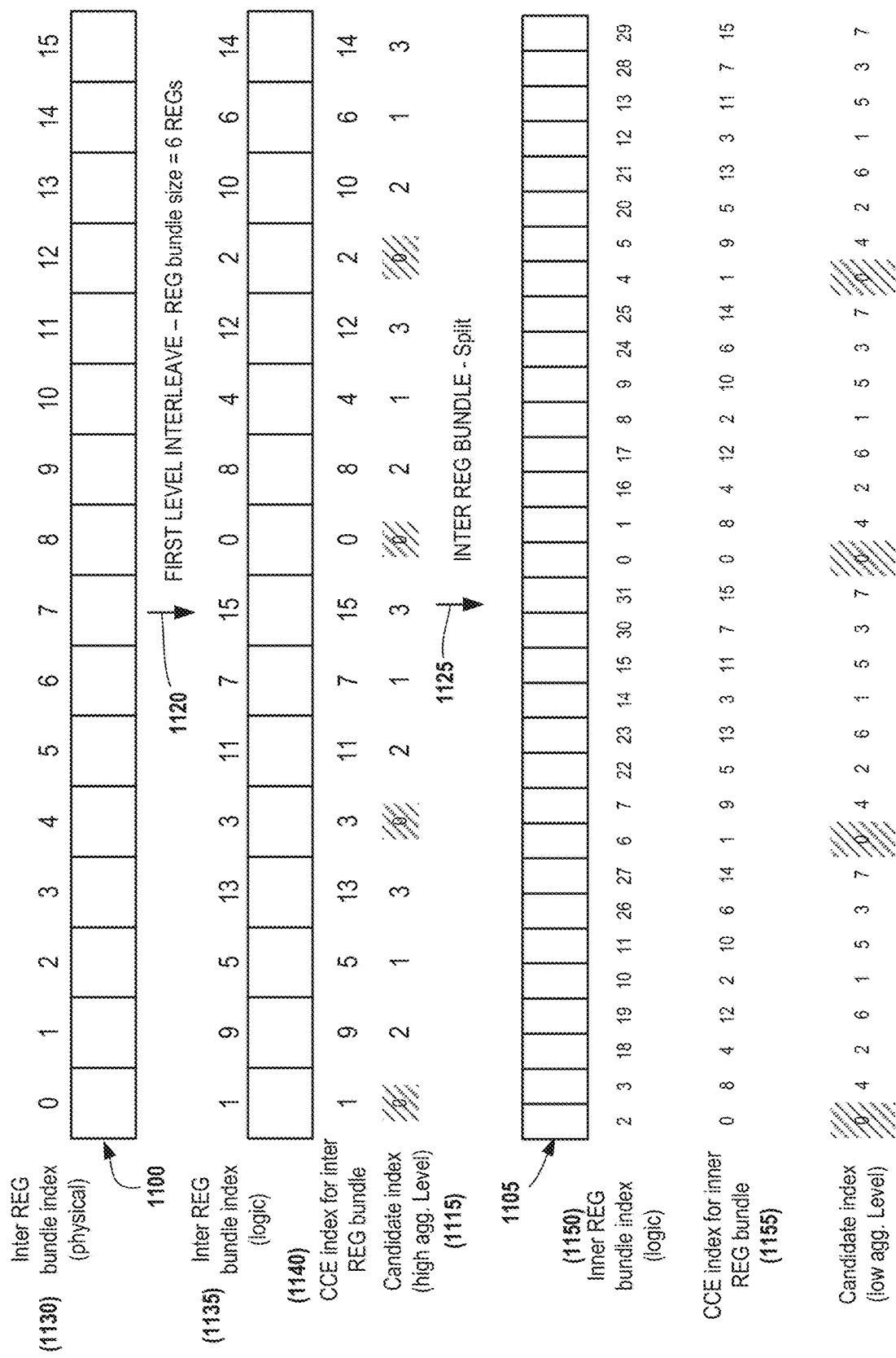
FIG. 11 shows another illustrative embodiment of resources having different aggregation levels undergoing interleaving, wherein inter REG bundles are split during interleaving into inter REG bundles.

For the embodiments in FIG. 11, it is assumed that there is a CORESET with a total of 16 CCEs, and two type of REG bundles, respectively: (i) an inter REG bundle 1100, which includes a size of 6 REGs, and (ii) an inner REG bundle 1105, which includes a size of 3 REGs. The inter REG bundle can be used to define CCE indexes for high aggregation levels. The inner REG bundle can be used to define CCE indexes for low aggregation levels.

For some embodiments, the inter REG bundle 1100, as a basic resource unit, can have a resource range of the entire CORESET for interleaving, the inter REG bundle is arranged in a defined order (for example, within the frequency domain of the high aggregation level, from the low to high) to form an inter REG bundle physical index. And by implying interleaving these inter REG bundle physical index, the interleaved inter REG bundle physical index is indicated as an inter REG bundle logical index. The Inner REG bundle 1105 of a UE is defined under the resources corresponding to the candidates selected for the UE within a subset of the Inter REG bundle 1100.

CCE indexing 1140 for high AL corresponding to the inter REG bundles is defined based on the inter REG bundle logical index 1130 to create the accordingly order of the CCE index with the inter REG bundle logical index. The inter REG bundles can be mapped to the CCEs by assuming that a CCE contains M inter REG bundles 1100, every M logically consecutive inter REG bundles (that is, the logical index 1135 is continuous for M inter REG bundles 1100) to form a CCE. The inter REG bundle index 1135 is arranged from low to high corresponding to the CCE index 1140 from low to high. The value of M is the ratio of inter (larger) REG bundle size to inner(small) REG bundle size. Here because the inter REG bundle size is 6 REGs, and a CCE also contains six REGs, the value of M is 1, so a CCE amounts to an inter REG bundle 1100.

Each inter REG bundle 1100 can be split into N inner REG bundles 1105 conducted according to the logical index order of the inter REG bundle 1100. Thus, the N inner REG bundles collectively form a composite resource bundle that was split. N can be equal to the ratio of the inter REG bundle size to the inner REG bundle size, which is 6/3, or 2 in the present example. The logical index 1150 of the inner REG bundle 1105 from low to high corresponds to the logical index of the inter REG bundle from low to high. When the inter REG bundle size is 6 REGs and the inner REG bundle size is 3 REGs, the value of N is 2, and the logical index of the two inner REG bundles 1105 corresponding to the inter REG bundle 1100 of i is given by the formula 2*i and 2*i+1. In other words, for the first logical Inter REG bundle index value of i=1 in FIG. 11, the values of the two logic Inner REG bundle index values formed by splitting the resource corresponding to the Inter REG bundle index value of i=1 into two separate resources are: 2*1=1, and 2*1+1=3. These first two logical inner REG bundle index values are reflected in FIG. 11. As another example, for the second logical Inter REG bundle index value of i=9, the two corresponding logical inner REG bundle index values are 2*9=18, and 2*9+1=19, as shown in FIG. 11.

FIG. 12 shows a technique for defining a CCE index 1155 for low AL based on the logical inner REG bundle index 1150 in accordance in a predefined manner. When the inter REG bundle size is 6 REGs and the inner REG bundle size is 3 REGs, the present technique defines the CCE index for the low aggregation level as follows:

1) For inner REG bundles having even inner REG bundle index values, the even inner REG bundle index values are considered in ascending order as shown in FIG. 12. The inner REG bundle index can be divided into two groups with even and odd index respectively, and with the CCE indexing order as the first index order of the two groups which means the CCE indexing first in the first group containing even inner REG bundle index and then continue indexing in the second group containing odd inner REG bundle index. Take an example of the first group containing even inner REG bundle index. The even inner REG bundle index values are grouped in pairs, and every two logically consecutive inner REG bundles are group to one CCE. Take the CCE indexing increasing as the increasing of the inner REG bundle logical index increasing, and begin with the CCE index value of "0" for the first pair. For the example shown in FIG. 12, the first pair of even inner REG bundle index values includes "0" and "2". Being in the first pair, these even inner REG bundle index values are assigned CCE index value "0". Similarly, the second pair of even inner REG bundle index values includes "4" and "6". Each of these even inner REG bundle index values is assigned the CCE index value of "1", and so on. Generally, if N represents the numerical location of a pair of even inner REG bundle index values in the range of even inner REG bundle index value pairings, then the CCE index value assigned to each constituent in the Nth pair is given by N−1. Using the even inner REG bundle index values "4" and "6" again as an example, those even inner REG bundle index values form the second pair of values in FIG. 12, so N=2. Thus, those even inner REG bundle index values are assigned a CCE index value given by: N−1, or 2−1=1. Similarly, even inner REG bundle index values "16" and "18" are constituents of the 5th pair of even inner REG bundle index values, so N=5. Thus, even inner REG bundle index values "16" and "18" are assigned CCE index values of "4" (5−1) in FIG. 12. If there are P1 CCEs (or pairs of even inner REG bundle index values) within the range of even inner REG bundle index values, the range of CCE index values will be from 0 to P1−1.

2) To map the odd inner REG bundle index values to CCE index values for the low aggregation level, the odd inner REG bundle index values are again considered in ascending order as shown in FIG. 12, and an incrementally-increasing CCE index value is assigned to each constituent in a pair. However, CCE index value assigned to the first pair of odd inner REG bundle index values is one increment greater than the greatest CCE index value assigned to an even inner REG bundle index value. Referring once again to FIG. 12, the odd inner REG bundle index values "1" and "3" are the first pair of odd inner REG bundle index values. Rather than assigning each constituent in that pair a CCE index value of "0" however, the CCE index value of "8" is assigned to the odd inner REG bundle index values "1" and "3", which is one greater than the greatest CCE index value ("7") assigned to an even inner REG bundle index value. Thus, the range of CCE index values for the odd inner REG bundle index values will be from P1 to (P1+P2−1), where P2 is the number of CCE index values assigned to pairs of odd inner REG bundle index values.

The result of the CCE mapping can be seen in FIG. 11. Any candidate 1110 of the low aggregation level contains the inner REG bundles 1105 located in the same candidate 1115 resources of the high aggregation level. As a result, this approach implements the coexistence of multiple REG bundles in the same CORESET, while reducing the blocking probability of the candidates of different AL corresponding to different REG bundle size.

Example 5

For Example 5, the REG bundle with bundle size 6 coexists with the REG bundle with bundle sizes 3 and 2. The present example will be described with reference to FIGS. 13 and 14.

Different REG bundle to CCE mappings (REG bundle to CCE mapping also called CCE indexing) are defined for different REG bundle sizes and the different REG bundle sizes corresponding to different aggregation levels. For example, a large REG bundle size corresponds to a high aggregation level, and a small REG bundle size corresponds to a low aggregation level in the present example. Here the CCE indexing establishes a mapping (or mapping pattern) from the REG bundle logical index to the CCE index. For small REG bundle, the CCE mapping results that all the small REG bundles within any one of the low AL candidates corresponding to small REG bundle is located in the same one high AL candidate corresponding to large REG bundle.

Figure 13:
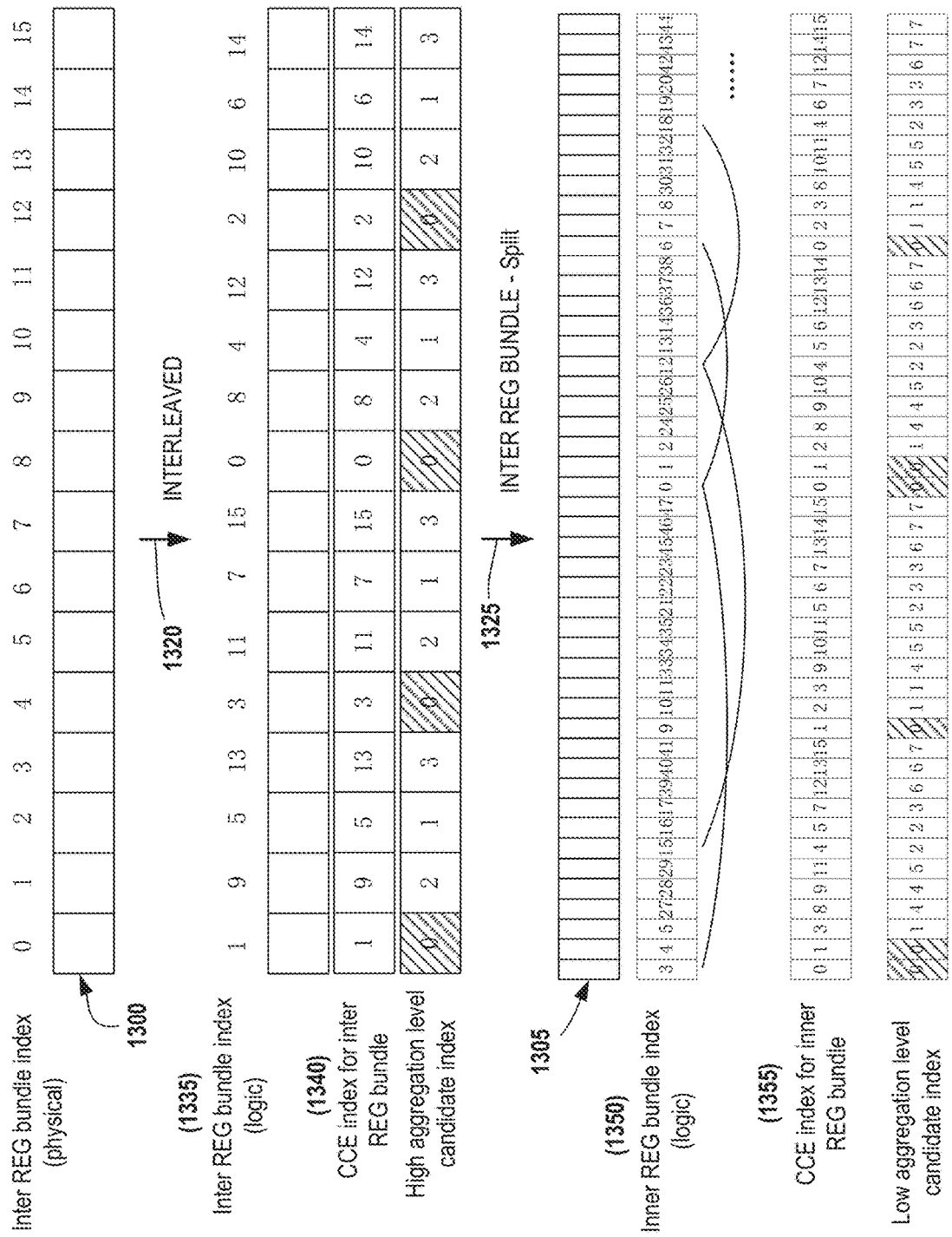
FIG. 13 shows another illustrative embodiment of resources having different aggregation levels undergoing interleaving, wherein inter REG bundles are split during interleaving into inter REG bundles.

In FIG. 13, it is assumed that a CORESET is provided with a total of 16 CCE, and there are two types of REG bundles, respectively (i) an Inter REG bundle 1300, with a bundle size of 6 REGs, and (ii) an Inner REG bundle 1305, with a bundle size of two REGs. The Inter REG bundle 1300 can be used to define the CCE index 1340 for high aggregation levels, and the Inner REG bundle 1305 can be used to define CCE indexes 1355 for low aggregation levels.

The technique shown in FIG. 13 involves interleaving 1320 the inter REG bundle 1300 as the basic resource unit with the physical inter REG bundle index in the entire CORESET, to generate the resources corresponding to the logical REG bundle index 1335. Based on the logical inter REG bundle index 1335, the CCE index values 1340 for high ALs can be defined according to a predefined process. The inter REG bundle can be mapped to the CCEs as is known in the art, by assuming that a CCE contains M inter REG bundles 1300, each of the M logically consecutive inter REG bundles (that is, the logical index is continuous over M inter REG bundles 1300) to form a CCE. The inter REG bundle index 1335 is configured from low to high corresponding to the CCE index 1340 from low to high. Because the inter REG bundle size is 6 REGs, and a CCE also contains 6 REGs, M has a value of 1, so a CCE amounts to an inter REG bundle in the present example.

Each inter REG bundle 1300 is split into N inner REG bundles according to the logical index order of the inter REG bundles 1300, where N is equal to the ratio of the inter REG bundle size and the inner REG bundle size. The logical inner REG bundle index 1350 in ascending order, from low to high corresponds to the logical inter REG bundle index 1335 in ascending order, from low to high. When the inter REG bundle size is 6 REGs and the inner REG bundle size is 2 REGs, the value of N is 3, and the logical index values of the three inner REG bundles corresponding to the inter REG bundle index value of i is 3*i, 3*i+1 and 3*i+2. For example, for the second logical Inter REG bundle index value of i=9, the three corresponding logical inner REG bundle index values are 3*9=27, 2*9+1=28, and 2*9+2=29, as shown in FIG. 13.

Based on the inner REG bundle index in accordance with the technique for defining a CCE index for the low aggregation level(s) corresponding to the inner REG bundles, FIG. 14 shows a predefined mapping method between the inner REG bundle index 1350 and the CCE index 1355 for low aggregation level(s). In particular, the method involves:

1) Divide all inner REG bundles into groups with W inner REG bundle in each group, and the group index increasing accordingly with the order of the first index REG bundle index in each group. CCE indexing is done with group index increasing direction across all the inner REG bundles. The W inner REG bundle can optionally be the inner REG bundle corresponding to the resources of one candidate of high aggregation level corresponding to inter REG bundle.

2) Take an example of the first group, and then between groups, the CCE index is determined in accordance with the same pattern to achieve the inner REG bundle index to the CCE index mapping. For example, when the ratio of the REG bundle size of the large aggregation level and the REG bundle size of the small aggregation level is 3, each group contains N*L (L is the aggregation level) Inner REG bundles. Assuming the aggregation level is 4, then each group contains a logical 12 (N is 3 and L is 4) consecutive inner REG bundles. The logical index of the inner REG bundles included in the nth (n is a nonnegative integer) group is given by <12*n, 12*n+1, . . . , 12*n+11>, and selecting every third value (as the value of N), beginning with value "0" for group n=0 as the sorted inner REG bundle index values. and the sorted inner REG bundle indexes are given by 12n+3m+1 (m=0, 1, 2, 3), 12n+3m+2 (m=0, 1, 2, 3), and every N REG bundles form a CCE based on the sorted inner REG bundle indexes.
3) Since N=3 in the present example, each constituent in a group of three inner REG bundle index values is assigned an incrementally increasing CCE index value, that increases one increment for each group, as shown in FIG. 14.

Figure 15:
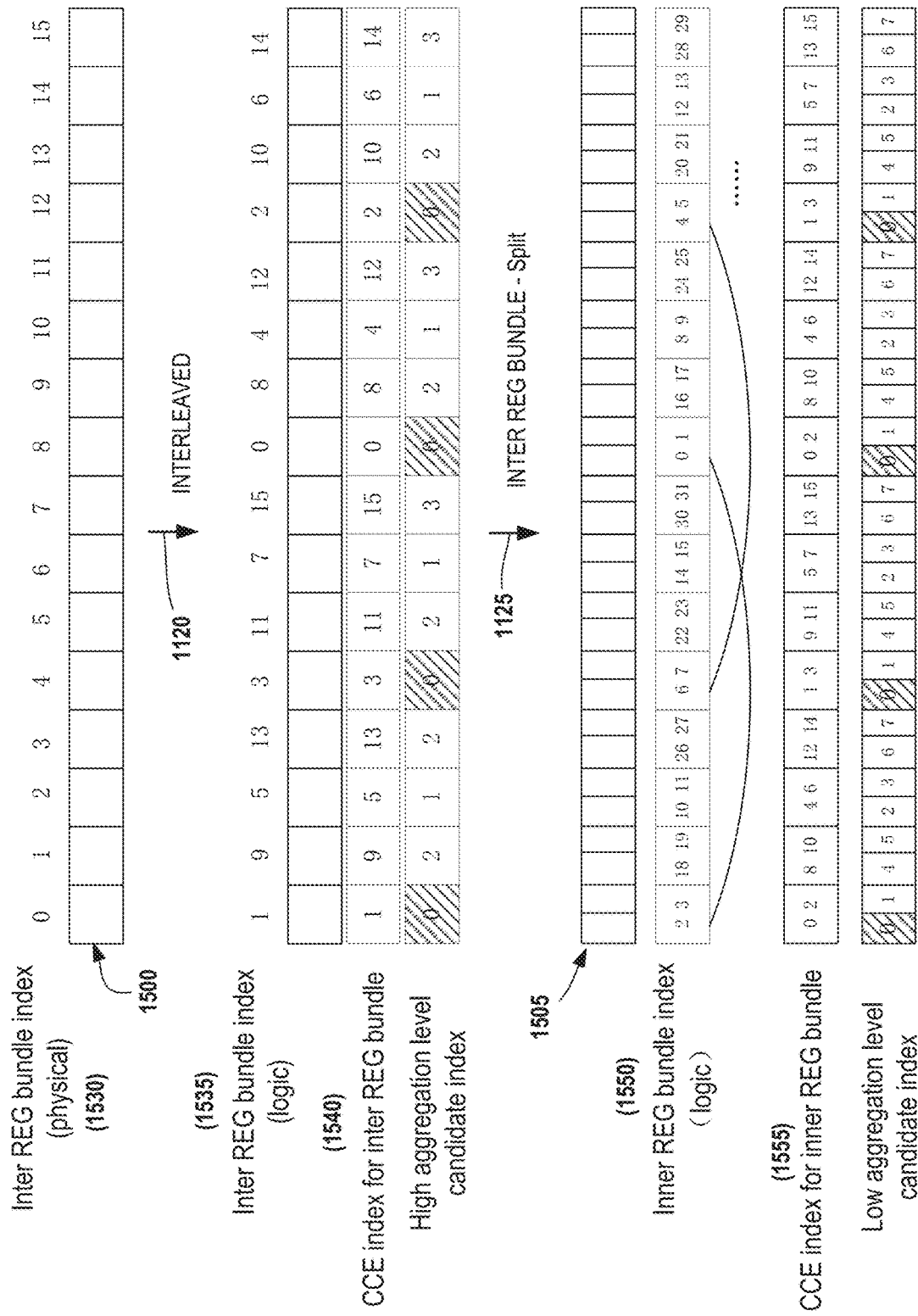
FIG. 15 shows another illustrative embodiment of resources having different aggregation levels undergoing interleaving, wherein inter REG bundles are split during interleaving into inter REG bundles.

As another example explained with respect to FIG. 15, assume a CORESET includes a total of 16 CCE, and there are two REG bundle, respectively: (i) Inter REG bundle having a size of 6 REGs, and (ii) Inner REG bundle, having a size of 3 REGs. The Inter REG bundle can be used to define CCE indexes for high aggregation levels. The Inner REG bundle can be used to define CCE index values for low aggregation levels.

The Inter REG bundle has an interleaved resource range of the entire CORESET. After the physical resources corresponding to the inter REG bundle logical index 1535, the inter REG bundle index order, in accordance with a predefined technique, is used to define a CCE index 1540 for high ALs. The inter REG bundle to CCE is mapped in a conventional manner, by assuming that a CCE contains M inter REG bundles, every M logically consecutive inter REG bundles (that is, the logical index is continuous M inter REG bundles) forms a CCE, based on the inter REG bundle index from low to high corresponding to the CCE index from low to high. Here because the inter REG bundle size for the 6 REGs, a CCE also contains six REGs, M value of 1, so a CCE amounts to an inter REG bundle.

Each inter REG bundle 1500 is split into N inner REG bundles according to the logical order of the inter REG bundle index 1530, where N is equal to the ratio of the inter REG bundle size and the inner REG bundle size. And the logical inner REG bundle index 1550, from low to high corresponds to the logical inter REG bundle index 1535, from low to high. When the inter REG bundle size is 6 REGs and the inner REG bundle size is 3 REGs, the value of N is 2, and the logical index of the two inner REG bundles corresponding to the inter REG bundle of i is 2*i, and 2*i+1.

Based on the inner REG bundle index 1550 in accordance with a predefined process to define a CCE index 1555 for low ALs. FIG. 16 shows the mapping between the inner REG bundle index 1550 and the CCE index 1550 for the low aggregation level, that is, the predefined process involves the following:
1) Divide all inner REG bundles into groups with W inner REG bundle in each group, and the group index increasing accordingly with the order of the first index REG bundle index in each group. CCE indexing is done with group index increasing direction across all the inner REG bundles. The W inner REG bundle can optionally be the inner REG bundle corresponding to the resources of one candidate of high aggregation level corresponding to inter REG bundle.
2) Take an example of the first group, and then between groups, the CCE index is determined in accordance with the same pattern to achieve the inner REG bundle index to the CCE index mapping. For example, when the ratio of the REG bundle size of the high aggregation level and the REG bundle size of the low aggregation level is 2, each group contains N*L (L is the aggregation level). If the aggregation level is 4, contains eight consecutive inner REG bundles that are logically consecutive, and the logical index of the inner REG bundles included in the nth (n is a nonnegative integer) group is <8*n, 8*n+1, . . . , 8*n+7>. The logical indexes of the inner REG bundles are sorted in the order of 8n+2m (m=0, 1, 2, 3), 8n+2m+1 (m=0, 1, 2, 3), and every N inner REG bundles to form a CCE after sorting.
3) The CCE index included in the nth group inner REG bundle is defined as L*n~L*n+W−1 according to the CCE or candidate index order of the high aggregation level, where L is the high aggregation level.

As can be seen from FIGS. 15 and 16, the inner REG bundles contained in any one of the low aggregation levels are within the same candidate's resources of the high aggregation level. As a result, this approach implements the coexistence of multiple REG bundles in the same CORESET, while reducing the blocking probability of the candidates of different AL corresponding to different REG bundle size.

Figure 17:
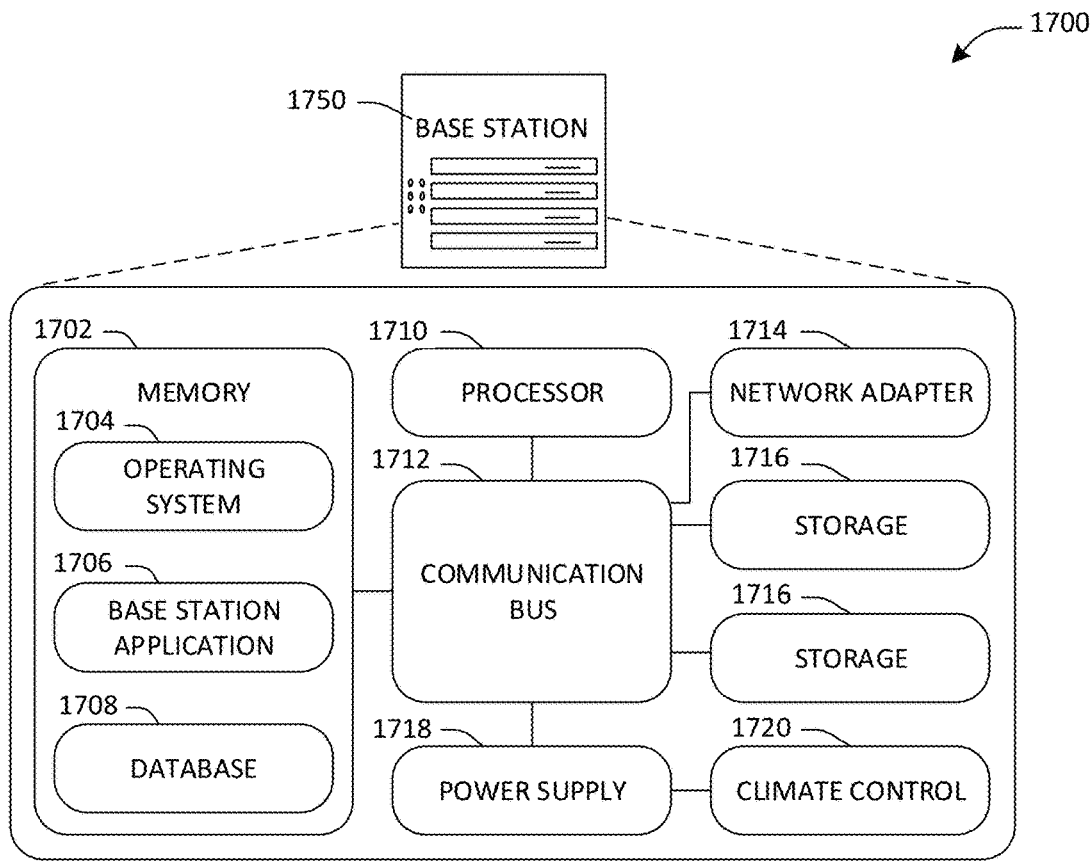
FIG. 17 is an illustration of a scenario involving an example configuration of a base station (BS) that may utilize and/or implement at least a portion of the techniques presented herein.

FIG. 17 presents a schematic architecture diagram 1700 of a base station 1750 (e.g., a network entity) that may utilize at least a portion of the techniques provided herein. Such a base station 1750 may vary widely in configuration and/or capabilities, alone or in conjunction with other base stations, nodes, end units and/or servers, etc. in order to provide a service, such as at least some of one or more of the other disclosed techniques, scenarios, etc. For example, the base station 1750 may connect one or more user equipment (UE) to a (e.g., wireless and/or wired) network (e.g., which may be connected and/or include one or more other base stations), such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The network may implement a radio technology, such as Universal Terrestrial Radio Access (UTRA), CDMA2000, Global System for Mobile Communications (GSM), Evolved UTRA (E-UTRA), IEEE 802.11, IEEE 802.16, IEEE 802.20, Flash-OFDM, etc. The BS and/or the UE may communicate using a standard, such as Long-Term Evolution (LTE), 5G New Radio (NR), etc.

The base station 1750 may comprise one or more (e.g., hardware) processors 1710 that process instructions. The one or more processors 1710 may optionally include a plurality of cores; one or more coprocessors, such as a mathematics coprocessor or an integrated graphical processing unit (GPU); and/or one or more layers of local cache memory. The base station 1750 may comprise memory 1702 storing various forms of applications, such as an operating system 1704; one or more base station applications 1706; and/or various forms of data, such as a database 1708 and/or a file system, etc. The base station 1750 may comprise a variety of peripheral components, such as a wired and/or wireless network adapter 1714 connectible to a local area network and/or wide area network; one or more storage components 1716, such as a hard disk drive, a solid-state storage device (SSD), a flash memory device, and/or a magnetic and/or optical disk reader; and/or other peripheral components.

The base station 1750 may comprise a mainboard featuring one or more communication buses 1712 that interconnect the processor 1710, the memory 1702, and/or various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 1712 may interconnect the base station 1750 with at least one other server. Other components that may optionally be included with the base station 1750 (though not shown in the schematic diagram 1700 of FIG. 17) include a display; a display adapter, such as a graphical processing unit (GPU); input peripherals, such as a keyboard and/or mouse; and/or a flash memory device that may store a basic input/output system (BIOS) routine that facilitates booting the base station 1750 to a state of readiness, etc.

The base station 1750 may operate in various physical enclosures, such as a desktop or tower, and/or may be integrated with a display as an "all-in-one" device. The base station 1750 may be mounted horizontally and/or in a cabinet or rack, and/or may simply comprise an interconnected set of components. The base station 1750 may comprise a dedicated and/or shared power supply 1718 that supplies and/or regulates power for the other components. The base station 1750 may provide power to and/or receive power from another base station and/or server and/or other devices. The base station 1750 may comprise a shared and/or dedicated climate control unit 1720 that regulates climate properties, such as temperature, humidity, and/or airflow. Many such base stations 1750 may be configured and/or adapted to utilize at least a portion of the techniques presented herein.

Figure 18:
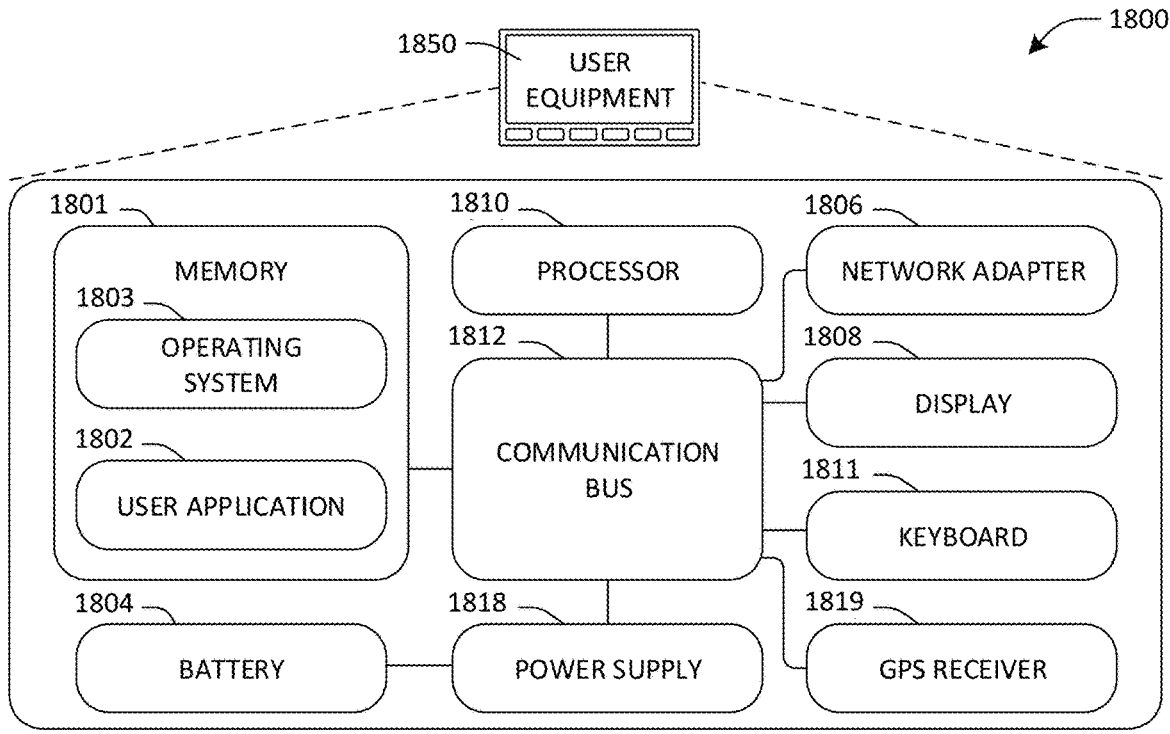
FIG. 18 is an illustration of a scenario involving an example configuration of a user equipment (UE) that may utilize and/or implement at least a portion of the techniques presented herein.

FIG. 18 presents a schematic architecture diagram 1800 of a user equipment (UE) 1850 (e.g., a communication device) whereupon at least a portion of the techniques presented herein may be implemented. Such a UE 1850 may vary widely in configuration and/or capabilities, in order to provide a variety of functionality to a user. The UE 1850 may be provided in a variety of form factors, such as a mobile phone (e.g., a smartphone); a desktop or tower workstation; an "all-in-one" device integrated with a display 1808; a laptop, tablet, convertible tablet, or palmtop device; a wearable device, such as mountable in a headset, eyeglass, earpiece, and/or wristwatch, and/or integrated with an article of clothing; and/or a component of a piece of furniture, such as a tabletop, and/or of another device, such as a vehicle or residence. The UE 1850 may serve the user in a variety of roles, such as a telephone, a workstation, kiosk, media player, gaming device, and/or appliance.

The UE 1850 may comprise one or more (e.g., hardware) processors 1810 that process instructions. The one or more processors 1810 may optionally include a plurality of cores; one or more coprocessors, such as a mathematics coprocessor or an integrated graphical processing unit (GPU); and/or one or more layers of local cache memory. The UE 1850 may comprise memory 1801 storing various forms of applications, such as an operating system 1803; one or more user applications 1802, such as document applications, media applications, file and/or data access applications, communication applications, such as web browsers and/or email clients, utilities, and/or games; and/or drivers for various peripherals. The UE 1850 may comprise a variety of peripheral components, such as a wired and/or wireless network adapter 1806 connectible to a local area network and/or wide area network; one or more output components, such as a display 1808 coupled with a display adapter (optionally including a graphical processing unit (GPU)), a sound adapter coupled with a speaker, and/or a printer; input devices for receiving input from the user, such as a keyboard 1811, a mouse, a microphone, a camera, and/or a touch-sensitive component of the display 1808; and/or environmental sensors, such as a GPS receiver 1819 that detects the location, velocity, and/or acceleration of the UE 1850, a compass, accelerometer, and/or gyroscope that detects a physical orientation of the UE 1850. Other components that may optionally be included with the UE 1850 (though not shown in the schematic architecture diagram 1800 of FIG. 18) include one or more storage components, such as a hard disk drive, a solid-state storage device (SSD), a flash memory device, and/or a magnetic and/or optical disk reader; a flash memory device that may store a basic input/output system (BIOS) routine that facilitates booting the UE 1850 to a state of readiness; and/or a climate control unit that regulates climate properties, such as temperature, humidity, and airflow, etc.

The UE 1850 may comprise a mainboard featuring one or more communication buses 1812 that interconnect the processor 1810, the memory 1801, and/or various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The UE 1850 may comprise a dedicated and/or shared power supply 1818 that supplies and/or regulates power for other components, and/or a battery 1804 that stores power for use while the UE 1850 is not connected to a power source via the power supply 1818. The UE 1850 may provide power to and/or receive power from other client devices.

Figure 19:
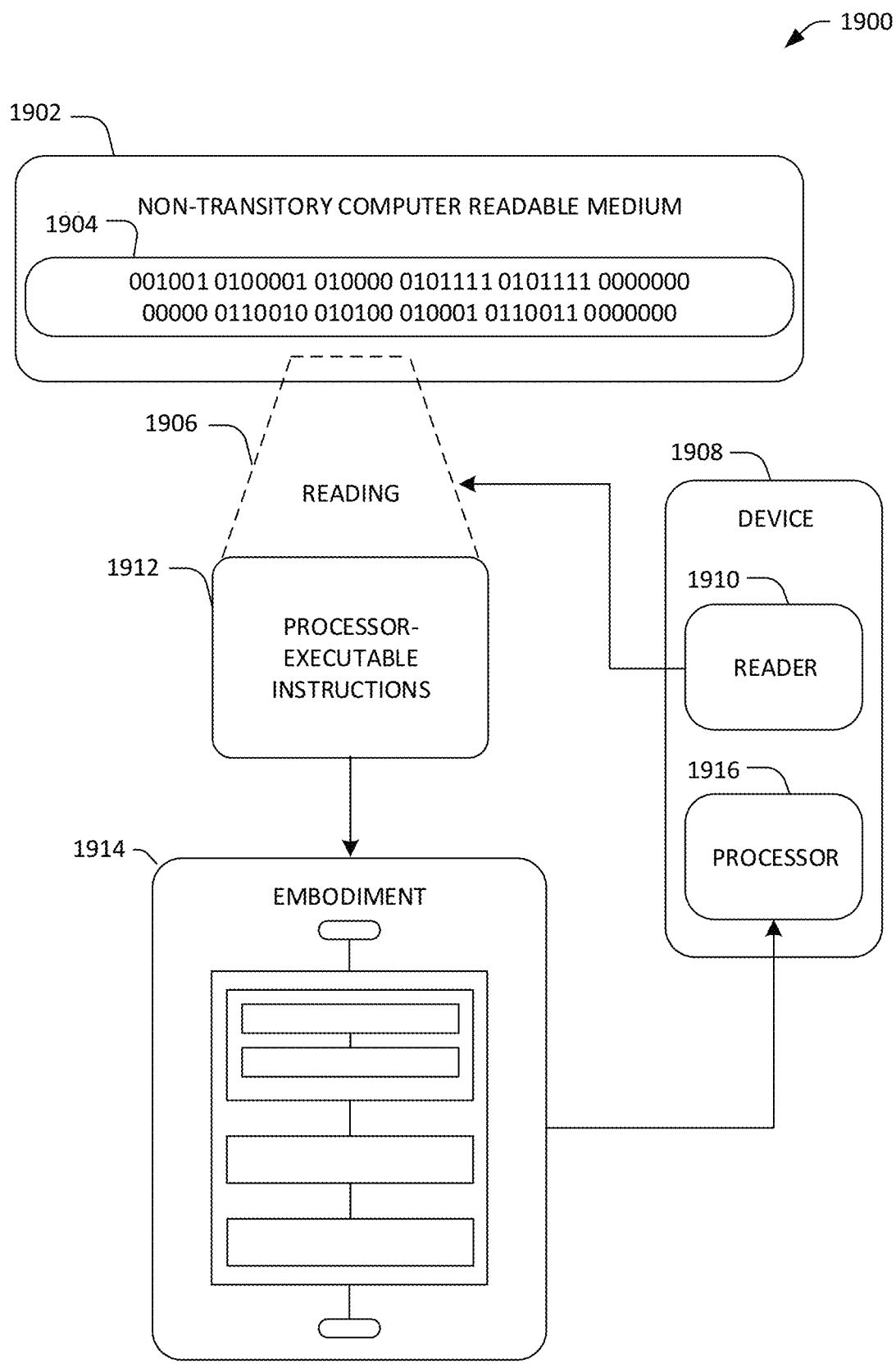
FIG. 19 is an illustration of a scenario featuring an example non-transitory computer readable medium in accordance with one or more of the provisions set forth herein.

FIG. 19 is an illustration of a scenario 1900 involving an example non-transitory computer readable medium 1902. The non-transitory computer readable medium 1902 may comprise processor-executable instructions 1912 that when executed by a processor 1916 cause performance (e.g., by the processor 1916) of at least some of the provisions herein. The non-transitory computer readable medium 1902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drives, a flash memory device, or a magnetic or optical disc (such as a compact disc (CD), digital versatile disc (DVD), and/or floppy disk). The example non-transitory computer readable medium 1902 stores computer-readable data 1904 that, when subjected to reading 1906 by a reader 1910 of a device 1908 (e.g., a read head of a hard disk drive, or a read operation invoked on a solid-state storage device), express the processor-executable instructions 1912. In some embodiments, the processor-executable instructions 1912, when executed, cause performance of operations, such as at least some of the example method of FIGS. 2 and 3, for example. In some embodiments, the processor-executable instructions 1912 are configured to cause implementation of a system and/or scenario, such as at least some of the exemplary system described herein.

As used in this application, "module," "system", "interface", and/or the like are generally intended to refer to a computer-related entity, either hardware, a combination of hardware and software, software, or software in execution.

For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers (e.g., nodes(s)).

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example," "illustrative embodiment," are used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer (e.g., node) to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of wireless communication, comprising:
    transmitting a control channel using a control resource set (CORESET);
    wherein the CORESET comprises:
    a first plurality of resource element group (REG) bundles, each first REG bundle comprising a first quantity of REGs,
    wherein the first plurality of REG bundles are interleaved within the CORESET; and
    a second plurality of REG bundles, each second REG bundle comprising a second quantity of REGs that is different from the first quantity of REGs,
    wherein the second plurality of REG bundles are interleaved within the CORESET.

2. The method of claim 1, wherein the first plurality of REG bundles and the second plurality of REG bundles are interleaved in an order in frequency domain.

3. The method of claim 1,
    wherein a first subset of REG bundles from the first plurality of REG bundles are candidates for a first aggregation level, and
    wherein a second subset of REG bundles from the second plurality of REG bundles are candidates for a second aggregation level lower than the first aggregation level.

4. The method of claim 3, wherein each REG bundle from the second subset of REG bundles has a resource range that correspond to a resource from a REG bundle from the first subset of REG bundles.

5. The method of claim 1, wherein each REG bundle from the first plurality of REG bundles forms one control channel element (CCE).

6. The method of claim 1, wherein every N consecutive REG bundles from the second plurality of REG bundles forms one control channel element (CCE), and wherein N is a positive integer greater than 1.

7. The method of claim 1, wherein the CORESET includes a plurality of control channel elements (CCEs), wherein each CCE is associated with one REG bundle from the first plurality of REG bundles, and wherein at least some CCEs from the plurality of CCEs are associated with the second plurality of REG bundles.

8. A device for wireless communication, comprising:
    at least one processor configured to cause the device to:
    transmit a control channel using a control resource set (CORESET);
        wherein the CORESET comprises:
    a first plurality of resource element group (REG) bundles, each first REG bundle comprising a first quantity of REGs,
    wherein the first plurality of REG bundles are interleaved within the CORESET; and
    a second plurality of REG bundles,
    each second REG bundle comprising a second quantity of REGs that is different from the first quantity of REGs,
    wherein the second plurality of REG bundles are interleaved within the CORESET.

9. The device of claim 8, wherein the first plurality of REG bundles and the second plurality of REG bundles are interleaved in an order in frequency domain.

10. The device of claim 8,
wherein a first subset of REG bundles from the first plurality of REG bundles are candidates for a first aggregation level, and
wherein a second subset of REG bundles from the second plurality of REG bundles are candidates for a second aggregation level lower than the first aggregation level.

11. The device of claim 10, wherein each REG bundle from the second subset of REG bundles has a resource range that correspond to a resource from a REG bundle from the first subset of REG bundles.

12. The device of claim 8, wherein each REG bundle from the first plurality of REG bundles forms one control channel element (CCE).

13. The device of claim 8, wherein every N consecutive REG bundles from the second plurality of REG bundles forms one control channel element (CCE), and wherein N is a positive integer greater than 1.

14. The device of claim 8, wherein the CORESET includes a plurality of control channel elements (CCEs), wherein each CCE is associated with one REG bundle from the first plurality of REG bundles, and wherein at least some CCEs from the plurality of CCEs are associated with the second plurality of REG bundles.

15. A non-transitory computer-readable medium having stored thereon processor-executable instructions that, when executed by at least one processor, cause a device to perform a method for wireless communication, comprising:

transmitting a control channel using a control resource set (CORESET);

wherein the CORESET comprises:
a first plurality of resource element group (REG) bundles, each first REG bundle comprising a first quantity of REGs,
wherein the first plurality of REG bundles are interleaved within the CORESET; and
a second plurality of REG bundles, each second REG bundle comprising a second quantity of REGs that is different from the first quantity of REGs,
wherein the second plurality of REG bundles are interleaved within the CORESET.

16. The non-transitory computer-readable medium of claim 15, wherein the first plurality of REG bundles and the second plurality of REG bundles are interleaved in an order in frequency domain.

17. The non-transitory computer-readable medium of claim 15,
wherein a first subset of REG bundles from the first plurality of REG bundles are candidates for a first aggregation level, and
wherein a second subset of REG bundles from the second plurality of REG bundles are candidates for a second aggregation level lower than the first aggregation level.

18. The non-transitory computer-readable medium of claim 17, wherein each REG bundle from the second subset of REG bundles has a resource range that correspond to a resource from a REG bundle from the first subset of REG bundles.

19. The non-transitory computer-readable medium of claim 15, wherein each REG bundle from the first plurality of REG bundles forms one control channel element (CCE).

20. The non-transitory computer-readable medium of claim 15, wherein every N consecutive REG bundles from the second plurality of REG bundles forms one control channel element (CCE), and wherein N is a positive integer greater than 1.

* * * * *